(12) United States Patent
Kotalwar

(10) Patent No.: US 11,949,580 B2
(45) Date of Patent: Apr. 2, 2024

(54) DATA CENTER MANAGEMENT BASED ON PROBING

(71) Applicant: NOKIA SOLUTIONS AND NETWORKS OY, Espoo (FI)

(72) Inventor: Jayant Kotalwar, Cupertino, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/550,826

(22) Filed: Dec. 14, 2021

(65) Prior Publication Data

US 2023/0188450 A1 Jun. 15, 2023

(51) Int. Cl.
*H04L 43/12* (2022.01)
*H04L 41/12* (2022.01)
*H04L 45/64* (2022.01)

(52) U.S. Cl.
CPC ............ *H04L 43/12* (2013.01); *H04L 41/12* (2013.01); *H04L 45/64* (2013.01)

(58) Field of Classification Search
CPC .......... H04L 43/12; H04L 41/12; H04L 45/64
See application file for complete search history.

(56) References Cited

U.S. PATENT DOCUMENTS

| 2019/0109783 A1* | 4/2019 | Kommula | ............... H04L 49/25 |
| 2020/0036624 A1 | 1/2020 | Michael et al. | |
| 2022/0210040 A1* | 6/2022 | Chen | ....................... H04L 45/64 |
| 2022/0253324 A1* | 8/2022 | Liu | ..................... G06F 11/2273 |
| 2022/0278926 A1* | 9/2022 | Sharma | ................. H04L 41/046 |

FOREIGN PATENT DOCUMENTS

EP 3716063 A1 9/2020

OTHER PUBLICATIONS

Liu, J., et al., "NetWatch: End-to-End Network Performance Measurement as a Service for Cloud," IEEE Transactions on Cloud Computing, vol. 7, No. 2, Apr. 1, 2019, XP011728235, pp. 553-567.
EP Extended Search Report mailed in counterpart EP Patent Application No. 22209653.9 dated May 11, 2023, 10 pages.

* cited by examiner

*Primary Examiner* — John A Follansbee
*Assistant Examiner* — Fadi Haj Said
(74) *Attorney, Agent, or Firm* — Tong, Rea, Bentley & Kim, LLC

(57) ABSTRACT

Various example embodiments for supporting data center management are presented herein. Various example embodiments for supporting data center management may be configured to support fabric service management for a data center fabric including a set of servers and a fabric network configured to support communications of the servers. Various example embodiments for supporting fabric service management within a data center may be configured to support a capability for configuring a fabric network of the data center fabric of the data center based on merging and unmerging of underlay and overlay configurations. Various example embodiments for supporting fabric service management within a data center may be configured to support a capability for debugging a fabric network of the data center fabric of the data center based on use of probes.

16 Claims, 10 Drawing Sheets

DATA CENTER MANAGEMENT BASED ON PROBING

TECHNICAL FIELD

Various example embodiments relate generally to communication systems and, more particularly but not exclusively, to data center management.

BACKGROUND

In communication systems, various communications technologies may be used to support various types of communications.

SUMMARY

In at least some example embodiments, an apparatus includes at least one processor and at least one memory including computer program code, wherein the at least one memory and the computer program code are configured to, with the at least one processor, cause the apparatus to at least determine, for a tenant of a data center having a data center network and based on mapping information indicative of mappings of a set of network overlay connections of the tenant in the data center network to a set of network underlay connections of the data center network, a probe injection point in the data center network and a set of probe extraction points in the data center network, initiate injection of a probe packet at the probe injection point, monitor for detection of the probe packet at the set of probe extraction points, and perform a management action based on whether the probe packet is detected at any of the probe extraction points. In at least some example embodiments, the probe injection point is a tunnel endpoint of a tunnel and the set of probe extraction points includes a set of ports on one or more switches. In at least some example embodiments, the one or more switches includes at least one top of rack switch. In at least some example embodiments, the one or more switches includes at least one switch at a hierarchical network layer above a top of rack switch. In at least some example embodiments, the probe injection point is a port on a switch and the set of probe extraction points includes a set of one or more tunnel endpoints of one or more tunnels. In at least some example embodiments, the switch is a top of rack switch. In at least some example embodiments, the switch is a switch at a hierarchical network layer above a top of rack switch. In at least some example embodiments, the probe injection point is a port on a first switch at a first hierarchical network layer and the set of probe extraction points includes a port on a second switch at a second hierarchical network layer. In at least some example embodiments, the first hierarchical network layer is closer, than the second hierarchical network layer, to a set of servers supported by the first hierarchical network layer and the second hierarchical network layer. In at least some example embodiments, the first switch is a top of rack switch. In at least some example embodiments, the first hierarchical network layer is farther, than the second hierarchical network layer, from a set of servers supported by the first hierarchical network layer and the second hierarchical network layer. In at least some example embodiments, the second switch is a top of rack switch. In at least some example embodiments, the set of probe extraction points includes a third port on a third switch at a third hierarchical network layer. In at least some example embodiments, to initiate injection of the probe packet at the probe injection point, the at least one memory and the computer program code are configured to, with the at least one processor, cause the apparatus to at least send, toward a device with which the probe injection point is associated, the probe packet or instructions for generating the probe packet. In at least some example embodiments, to monitor for detection of the probe packet at the set of probe extraction points, the at least one memory and the computer program code are configured to, with the at least one processor, cause the apparatus to at least monitor for receipt, from one or more devices with which the probe extraction points are association, of one or more messages indicative that the probe packet was received at one or more of the probe extraction points. In at least some example embodiments, to perform the management action, the at least one memory and the computer program code are configured to, with the at least one processor, cause the apparatus to at least raise an alarm. In at least some example embodiments, to perform the management action, the at least one memory and the computer program code are configured to, with the at least one processor, cause the apparatus to at least initiate a message. In at least some example embodiments, to perform the management action, the at least one memory and the computer program code are configured to, with the at least one processor, cause the apparatus to at least determine, based on second mapping information and an indication of one of the extraction points at which the probe packet was detected, a second probe injection point and a set of second probe extraction points, initiate injection of a second probe packet at the second probe injection point, monitor for detection of the second probe packet at the set of second probe extraction points, and perform a second management action based on whether the second probe packet is detected at any of the second probe extraction points.

In at least some example embodiments, a non-transitory computer readable medium stores computer program code configured to cause an apparatus to at least determine, for a tenant of a data center having a data center network and based on mapping information indicative of mappings of a set of network overlay connections of the tenant in the data center network to a set of network underlay connections of the data center network, a probe injection point in the data center network and a set of probe extraction points in the data center network, initiate injection of a probe packet at the probe injection point, monitor for detection of the probe packet at the set of probe extraction points, and perform a management action based on whether the probe packet is detected at any of the probe extraction points. In at least some example embodiments, the probe injection point is a tunnel endpoint of a tunnel and the set of probe extraction points includes a set of ports on one or more switches. In at least some example embodiments, the one or more switches includes at least one top of rack switch. In at least some example embodiments, the one or more switches includes at least one switch at a hierarchical network layer above a top of rack switch. In at least some example embodiments, the probe injection point is a port on a switch and the set of probe extraction points includes a set of one or more tunnel endpoints of one or more tunnels. In at least some example embodiments, the switch is a top of rack switch. In at least some example embodiments, the switch is a switch at a hierarchical network layer above a top of rack switch. In at least some example embodiments, the probe injection point is a port on a first switch at a first hierarchical network layer and the set of probe extraction points includes a port on a second switch at a second hierarchical network layer. In at least some example embodiments, the first hierarchical network layer is closer, than the second hierarchical network layer, to a set of servers supported by the first hierarchical network layer and the second hierarchical network layer. In at least some example embodiments, the first switch is a top of rack switch. In at least some example embodiments, the first hierarchical network layer is farther, than the second hierarchical network layer, from a set of servers supported by the first hierarchical network layer and the second hierarchical network layer. In at least some example embodiments, the second switch is a top of rack switch. In at least some example embodiments, the set of probe extraction points includes a third port on a third switch at a third hierarchical network layer. In at least some example embodiments, to initiate injection of the probe packet at the probe injection point, the computer program code is configured to cause the apparatus to at least send, toward a device with which the probe injection point is associated, the probe packet or instructions for generating the probe packet. In at least some example embodiments, to monitor for detection of the probe packet at the set of probe extraction points, the computer program code is configured to cause the apparatus to at least monitor for receipt, from one or more devices with which the probe extraction points are association, of one or more messages indicative that the probe packet was received at one or more of the probe extraction points. In at least some example embodiments, to perform the management action, the computer program code is configured to cause the apparatus to at least raise an alarm. In at least some example embodiments, to perform the management action, the computer program code is configured to cause the apparatus to at least initiate a message. In at least some example embodiments, to perform the management action, the computer program code is configured to cause the apparatus to at least determine, based on second mapping information and an indication of one of the extraction points at which the probe packet was detected, a second probe injection point and a set of second probe extraction points, initiate injection of a second probe packet at the second probe injection point, monitor for detection of the second probe packet at the set of second probe extraction points, and perform a second management action based on whether the second probe packet is detected at any of the second probe extraction points.

In at least some example embodiments, a method includes determining, for a tenant of a data center having a data center network and based on mapping information indicative of mappings of a set of network overlay connections of the tenant in the data center network to a set of network underlay connections of the data center network, a probe injection point in the data center network and a set of probe extraction points in the data center network, initiating injection of a probe packet at the probe injection point, monitoring for detection of the probe packet at the set of probe extraction points, and performing a management action based on whether the probe packet is detected at any of the probe extraction points. In at least some example embodiments, the probe injection point is a tunnel endpoint of a tunnel and the set of probe extraction points includes a set of ports on one or more switches. In at least some example embodiments, the one or more switches includes at least one top of rack switch. In at least some example embodiments, the one or more switches includes at least one switch at a hierarchical network layer above a top of rack switch. In at least some example embodiments, the probe injection point is a port on a switch and the set of probe extraction points includes a set of one or more tunnel endpoints of one or more tunnels. In at least some example embodiments, the switch is a top of rack switch. In at least some example embodiments, the switch is a switch at a hierarchical network layer above a top of rack switch. In at least some example embodiments, the probe injection point is a port on a first switch at a first hierarchical network layer and the set of probe extraction points includes a port on a second switch at a second hierarchical network layer. In at least some example embodiments, the first hierarchical network layer is closer, than the second hierarchical network layer, to a set of servers supported by the first hierarchical network layer and the second hierarchical network layer. In at least some example embodiments, the first switch is a top of rack switch. In at least some example embodiments, the first hierarchical network layer is farther, than the second hierarchical network layer, from a set of servers supported by the first hierarchical network layer and the second hierarchical network layer. In at least some example embodiments, the second switch is a top of rack switch. In at least some example embodiments, the set of probe extraction points includes a third port on a third switch at a third hierarchical network layer. In at least some example embodiments, initiating injection of the probe packet at the probe injection point includes sending, toward a device with which the probe injection point is associated, the probe packet or instructions for generating the probe packet. In at least some example embodiments, monitoring for detection of the probe packet at the set of probe extraction points includes monitoring for receipt, from one or more devices with which the probe extraction points are association, of one or more messages indicative that the probe packet was received at one or more of the probe extraction points. In at least some example embodiments, performing the management action includes raising an alarm. In at least some example embodiments, performing the management action includes initiating a message. In at least some example embodiments, performing the management action includes determining, based on second mapping information and an indication of one of the extraction points at which the probe packet was detected, a second probe injection point and a set of second probe extraction points, initiating injection of a second probe packet at the second probe injection point, monitoring for detection of the second probe packet at the set of second probe extraction points, and performing a second management action based on whether the second probe packet is detected at any of the second probe extraction points.

In at least some example embodiments, an apparatus includes means for determining, for a tenant of a data center having a data center network and based on mapping information indicative of mappings of a set of network overlay connections of the tenant in the data center network to a set of network underlay connections of the data center network, a probe injection point in the data center network and a set of probe extraction points in the data center network, means for initiating injection of a probe packet at the probe injection point, means for monitoring for detection of the probe packet at the set of probe extraction points, and means for performing a management action based on whether the probe packet is detected at any of the probe extraction points. In at least some example embodiments, the probe injection point is a tunnel endpoint of a tunnel and the set of probe extraction points includes a set of ports on one or more switches. In at least some example embodiments, the one or more switches includes at least one top of rack switch. In at least some example embodiments, the one or more switches includes at least one switch at a hierarchical network layer above a top of rack switch. In at least some example embodiments, the probe injection point is a port on a switch and the set of probe extraction points includes a set of one or more tunnel endpoints of one or more tunnels. In at least some example embodiments, the switch is a top of rack switch. In at least some example embodiments, the switch is a switch at a hierarchical network layer above a top of rack switch. In at least some example embodiments, the probe injection point is a port on a first switch at a first hierarchical network layer and the set of probe extraction points includes a port on a second switch at a second hierarchical network layer. In at least some example embodiments, the first hierarchical network layer is closer, than the second hierarchical network layer, to a set of servers supported by the first hierarchical network layer and the second hierarchical network layer. In at least some example embodiments, the first switch is a top of rack switch. In at least some example embodiments, the first hierarchical network layer is farther, than the second hierarchical network layer, from a set of servers supported by the first hierarchical network layer and the second hierarchical network layer. In at least some example embodiments, the second switch is a top of rack switch. In at least some example embodiments, the set of probe extraction points includes a third port on a third switch at a third hierarchical network layer. In at least some example embodiments, the means for initiating injection of the probe packet at the probe injection point includes means for sending, toward a device with which the probe injection point is associated, the probe packet or instructions for generating the probe packet. In at least some example embodiments, the means for monitoring for detection of the probe packet at the set of probe extraction points includes means for monitoring for receipt, from one or more devices with which the probe extraction points are association, of one or more messages indicative that the probe packet was received at one or more of the probe extraction points. In at least some example embodiments, the means for performing the management action includes means for raising an alarm. In at least some example embodiments, the means for performing the management action includes means for initiating a message. In at least some example embodiments, the means for performing the management action includes means for determining, based on second mapping information and an indication of one of the extraction points at which the probe packet was detected, a second probe injection point and a set of second probe extraction points, means for initiating injection of a second probe packet at the second probe injection point, means for monitoring for detection of the second probe packet at the set of second probe extraction points, and means for performing a second management action based on whether the second probe packet is detected at any of the second probe extraction points.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting data center management are presented herein. Various example embodiments for supporting data center management may be configured to support fabric service management for a data center fabric including a set of servers and a fabric network configured to support communications of the servers. Various example embodiments for supporting fabric service management within a data center may be configured to support a capability for configuring a fabric network of the data center fabric of the data center based on merging and unmerging of underlay and overlay configurations. Various example embodiments for supporting fabric service management within a data center may be configured to support a capability for debugging a fabric network of the data center fabric of the data center based on use of probes. It will be appreciated that these and various other example embodiments and advantages or potential advantages of supporting data center management may be further understood by way of reference to the various figures, which are discussed further below.

Figure 1:
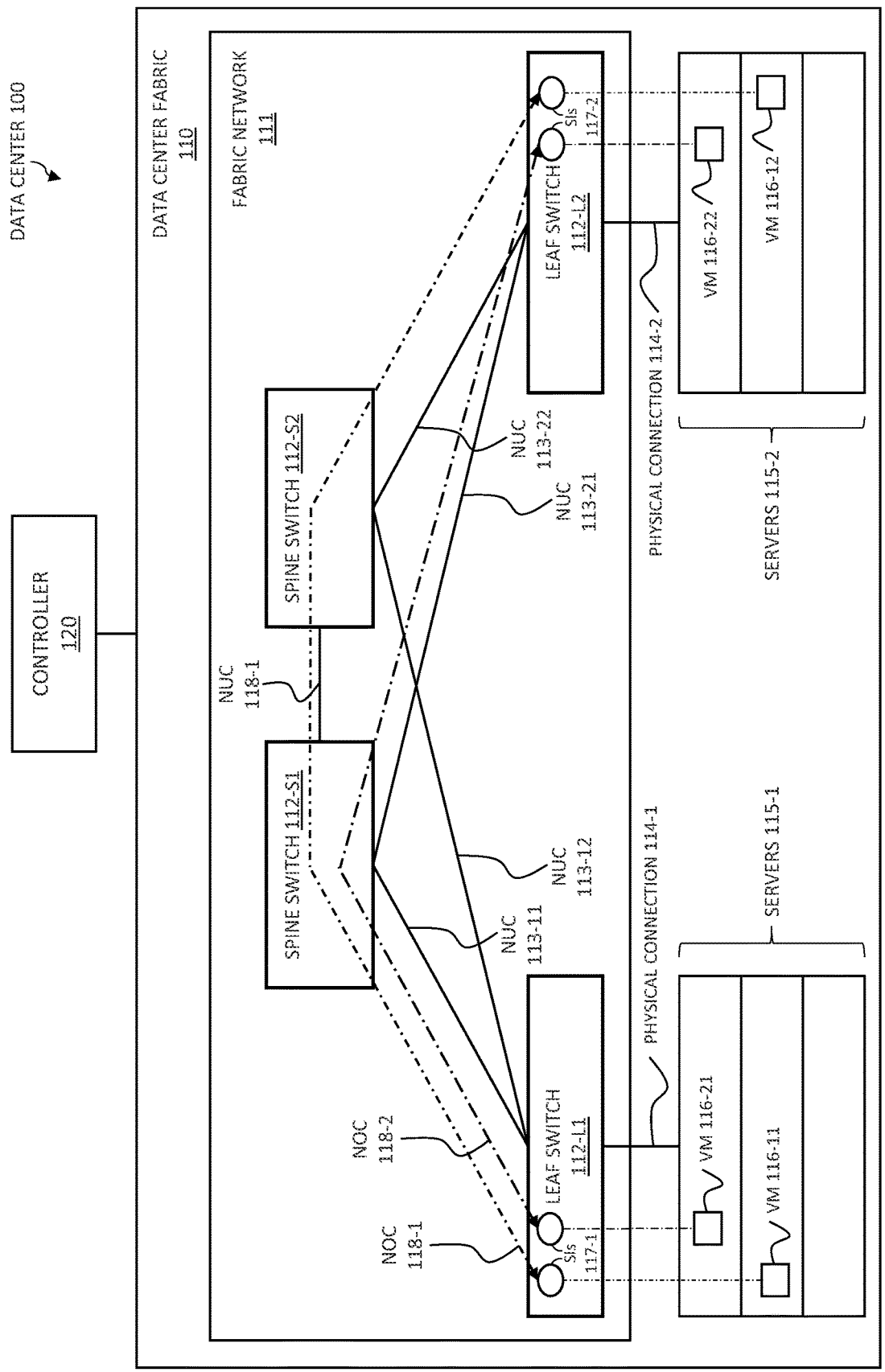
FIG. 1 depicts an example embodiment of a data center including a data center fabric and a controller configured to provide fabric services for the data center fabric.

FIG. 1 depicts an example embodiment of a data center including a data center fabric and a controller configured to provide fabric services for the data center fabric.

The data center 100 may include any suitable type of data center. For example, the data center 100 may be a traditional data center, a cloud data center, or the like. It will be appreciated that the data center 100, although primarily referred to herein as a data center, may represent various other types of communication systems in which communications of servers may be supported by network elements of a communication network and, thus, that in at least some example embodiments the references herein to data center and data center specific terms may be read more generally as references to more generic communication systems and more generic communication system terms, respectively.

The data center 100 includes a data center fabric 110 and a controller 120 configured to provide control functions for the data center fabric 110. The data center fabric 110 includes a fabric network 111 and a set of servers 115 where the fabric network 111 is configured to support communications of the set of servers 115. The fabric network 111 includes a set of switches 112 and an interconnection of the switches 112 that forms a network underlay for supporting communications of the switches 112. The servers 115 host applications and services for tenants and communications of the tenants are supported based on network overlays formed for the tenants which are supported by the network underlay of the fabric network 111. The controller 120 is configured to provide control functions for the data center fabric 110, including support for configuration of the data center fabric 110 to support the network underlay of the fabric network and the network overlays of the tenants of the servers 115 (e.g., initial configurations, reconfigurations in response to events and conditions, or the like), support for management of the data center fabric 110 to support the network underlay of the fabric network and the network overlays of the tenants of the servers 115 (e.g., fault monitoring, root cause analysis, or the like), or the like, as well as various combinations thereof.

In the fabric network 111, the switches 112 are arranged in a spine-leaf topology including two hierarchical levels. The set of switches 112 includes two leaf switches 112-L1 and 112-L2 (collectively, leaf switches 112-L) operating at a first hierarchical level and two spine switches 112-S1 and 112-S2 (collectively, spine switches 112) operating at a second hierarchical level that is above the first hierarchical level. The leaf switches 112-L are connected to respective groups of servers 115 in the set of the servers 115. The leaf switches 112-L may be top-of-rack (TOR) switches or other suitable switches. The switches 112 may include physical switches, virtual switches, or the like, as well as various combinations thereof. It will be appreciated that, although primarily presented with respect to specific numbers and arrangements of switches 112, the fabric network 111 may include various other numbers and arrangements of switches 112. It will be appreciated that, although primarily presented as including two hierarchical layers, the fabric network 111 may include any suitable number of hierarchical layers. It will be appreciated that, although omitted for purposes of clarity, the fabric network 111 may connect to one or more networks external to the data center 100 for supporting communications between the servers 112 and various elements external to the data center 100. It will be appreciated that the fabric network 111 may be arranged in various other ways.

In the fabric network 111, the switches 112 are interconnected, to form the network underlay, based on a set of network underlay connections (NUCs) 113 (illustratively, the leaf switch 112-L1 is connected to the spine switches 112-S1 and 112-S2 via network underlay connections 113-11 and 113-12, respectively, the leaf switch 112-L2 is connected to the spine switches 112-S1 and 112-S2 via network underlay connections 113-21 and 113-22, respectively, and the spine switches 112-S are interconnected by a network underlay connection 113-3). The network underlay connections 113 may include any suitable types of connections which may be used for a network underlay in a fabric network. For example, the network underlay connections 113 may include tunnels, sessions, or the like, as well as various combinations thereof. For example, the network underlay connections 113 may be based on Border Gateway Protocol (BGP) connectivity or other suitable types of connectivity. It will be appreciated that, although primarily presented with respect to a network underlay including specific numbers and arrangements of network underlay connections 113, the fabric network 111 may include various other numbers and arrangements of network underlay connections 113. It will be appreciated that the network underlay of the fabric network 111 may be implemented based on various other types of connections, protocols, or the like, as well as various combinations thereof.

In the data center fabric 110, the set of servers 115 includes a first group of servers 115-1 and a second group of servers 115-2. The first group of servers 115-1 is arranged in a rack and connected to the leaf switch 112-L1 (e.g., a TOR switch for the rack) and the second group of servers 115-2 is arranged in a rack and connected to the leaf switch 112-L2 (e.g., a TOR switch for the rack). The servers 115 are connected to the fabric network 111 via physical connections 114 between the racks of servers 115 and the leaf switches 112-L (illustratively, the servers 115-1 are connected to the leaf switch 112-L1 via a first physical connection 114-1 and the servers 115-2 are connected to the leaf switch 112-L2 via a second physical connection 114-2). The servers 115 are configured to host applications and services for tenants. For example, the servers 115 may include physical servers, virtual servers, or the like, as well as various combinations thereof. It will be appreciated that, although presented as having a specific numbers and arrangements of servers 115, the data center fabric 110 may include other numbers and arrangements of servers 115. For example, it will be appreciated that, although primarily presented with respect to two racks of servers 115, the data center fabric 110 may include more racks of servers 115. For example, it will be appreciated that, although primarily presented as including specific numbers of servers 115 per rack, the data center fabric 110 may include racks having various other numbers of servers 115. It will be appreciated that the servers 115 of the data center fabric 110 may be arranged in various other ways.

In the data center fabric 110, the servers 115 are configured to host applications and services for tenants. The applications and services for the tenants may be supported based on virtual processing elements (e.g., virtual machines (VMs), virtual containers (VCs), or the like) hosted for the tenants on the servers 115. In the example of FIG. 1, two tenants (denoted as T1 and T2) are illustrated. The tenant T1 has two VMs hosted within the data center fabric 110 (illustratively, a pair of VMs 116-1 including a first VM denoted as VM 116-11 on one of the servers 115 in the first set of servers 115-1 and a second VM denoted as VM 116-12 on one of the servers 115 in the second set of servers 115-2) and, similarly, the tenant T2 has two VMs hosted within the data center fabric 110 (illustratively, a pair of VMs 116-2 including a first VM denoted as VM 116-21 on one of the servers 115 in the first set of servers 115-1 and a second VM denoted as VM 116-22 on one of the servers 115 in the second set of servers 115-2). It will be appreciated that, although primarily presented with respect to tenants having specific types, numbers, and arrangements of virtual processing elements supported by the servers 115, tenants may include other types, numbers, and/or arrangements of virtual processing elements which may be supported by the servers 115. It will be appreciated that, although primarily presented with respect to supporting a specific number of tenants, the data center fabric 110 may support fewer or more tenants.

In the data center fabric 110, the communications of the applications and services hosted on the servers 115 for the tenants, which corresponds to the workloads of the tenants within the data center fabric 110, may be supported based on network overlays configured within the fabric network 111 for the tenants. The network overlays configured within the fabric network 111 for the tenants may be in the form of network overlay connections (NOCs) 118 associated with the tenants, respectively. For the first tenant T1, for example, communication between the pair of VMs 116-1 for the first tenant T1 is supported by a pair of sub-interfaces 117-1 (illustratively, sub-interfaces 117-11 and 117-12 on the first and second leaf switches 112-L1 and 112-L2, respectively) for the tenant and a network overlay connection 118-1 (illustratively, configured between the sub-interfaces 117-11 and 117-12 on the first and second leaf switches 112-L1 and 112-L2, respectively, which may correspond to tunnel endpoints where the network overlay connection 118-1 is a tunnel) for the tenant. For the second T2, for example, communication between the pair of VMs 116-2 for the second tenant T2 is supported by a pair of sub-interfaces 117-2 (illustratively, sub-interfaces 117-21 and 117-22 on the first and second leaf switches 112-L1 and 112-L2, respectively) for the tenant and a network overlay connection 118-2 (illustratively, configured between the sub-interfaces 117-21 and 117-22 on the first and second leaf switches 112-L1 and 112-L2, respectively, which may correspond to tunnel endpoints where the network overlay connection 118-2 is a tunnel) for the tenant. The network overlay connections 118 may include any suitable types of connections which may be used for a network overlay in a fabric network. For example, the network overlay connections 118 may include tunnels, sessions, or the like, as well as various combinations thereof. For example, the network overlay connections 118 may be virtual private network (VPN) tunnels, virtual extensible local area network (VXLAN) tunnels, or the like, as well as various combinations thereof. It will be appreciated that, although primarily presented with respect to supporting a specific number of tenants having specific numbers and arrangements of virtual processing elements and, thus, a specific number and arrangement of network overlay connections 118, the data center fabric 110 may support fewer or more tenants each having other numbers or arrangements of virtual processing elements and thus, other numbers and/or arrangements of network overlay connections 118.

In the data center fabric 110, the fabric network 111 is configured to support the tenant workloads of the tenants (illustratively, the communications of the VMs 116 hosted on the servers 115 for the tenants) based on configuration of the fabric network 111 to support the network overlays of the tenants and the network underlay configured to support the network overlays of the tenants. The configuration of the fabric network 111 to support the workloads of the tenants may include configuration of the switches 112 to support the network overlays of the tenants (illustratively, the network overlay connections 118 of the tenants) and configuration of the switches 112 to support the network underlay configured to support the network overlays of the tenants (illustratively, the network underlay connections 113). The switches 112 are configured to support the network underlay connections 113 by maintaining network underlay configuration information for the network underlay connections 113. The switches 112 are configured to support the network overlay connections 118 by maintaining network overlay configuration information for the network overlay connections 118. It will be appreciated that the switches 112 may be configured to store various other types of configuration information for supporting workloads of tenants hosted on the servers 115.

It will be appreciated that the data center fabric 110 may be configured to support tenants in various other ways.

The controller 120 is configured to provide control functions for the data center fabric 110, including support for configuration of the data center fabric 110 to support the network underlay of the fabric network 111 and the network overlays of the tenants of the servers 115 (e.g., initial configurations, reconfigurations in response to events and conditions, or the like), support for management of the data center fabric 110 to support the network underlay of the fabric network and the network overlays of the tenants of the servers 115 (e.g., fault monitoring, root cause analysis, or the like), or the like, as well as various combinations thereof. The controller 120 may be configured to provide control functions for the data center fabric 110 based on various data center management capabilities, such as support for fabric intent, support for fabric observability, support for fabric operations, support for fabric integrations, or the like, as well as various combinations thereof.

The controller 120 may be configured to provide control functions for the data center fabric 110 based on support for fabric intent. The controller 120 may support a declarative, intent-based automation and operations toolkit that delivers agile and scalable network operations for data center and cloud environments. The controller 120 may be configured to support intent-based automations for all phases of data center fabric operations, including Day 0 design, Day 1 deployment, and Day 2+ configuration, operation, measurement, and analysis of a data center fabric. The controller 120 may be configured to support all stages of the lifecycle of a fabric, including operations at scale for on-premises and cloud environments, based on a fabric services system architecture that is based on declarative fabric and workload intent, fabric operations, fabric observability, and fabric integrations.

The controller 120 may be configured to enable data center operators to simplify network designs using a standardized fabric (e.g., an IP fabric) while also supporting customized solutions that enable tenants to stay ahead in an increasingly competitive environment. The controller 120 may be configured to enable data center operators to manage a fabric composed of a group of switches which may be managed as a single logical unit, thereby providing an abstracted management model for the fabric. The controller 120 may be configured to provide a scalable automation and operations toolkit based on use of an architectural approach that is a combination of distributed routing running on data center switches with network-wide control and automation functions implemented in an external controller. The controller 120 may be configured to use a cloud-native approach to provide a scalable and distributed automation and operations platform for data centers. The controller 120 may be configured to use a set of distributed microservices to provide fabric services configured to deliver a cloud-native automation and operations system for data center environments. The controller 120, based on support for declarative intents and open management and telemetry of a model-drive network operating system, may be configured to support declarative, intent-based life-cycle management of data center fabrics as well as operations at scale.

The controller 120 may be configured to support fabric intent. The controller 120 may be configured to support fabric intent as code, such that the data center fabric may be represented as code. The controller 120 may be configured to support fabric intent as code based on representation of the intent and configuration state of the data center fabric in a declarative manner (e.g., based on a YAML format, a JSON format, or other suitable types of formats), thereby enabling support for continuous integration/continuous deployment (CI/CD) of network infrastructure and, thus, supporting a movement toward infrastructure as code. The controller 120 may be configured to support various other functions for supporting fabric intent.

The controller 120 may be configured to support abstracted fabric and workload intent. The controller 120 may be configured to support an intent infrastructure focused on defining an abstracted intent to quickly build fabrics and enable application workloads. The controller 120 may be configured to use the higher-level inputs from design teams to generate detailed per-node configurations to build underlay fabrics (e.g., BGP-based underlay fabrics or other suitable types of underlay fabrics) and overlay connectivity for tenant workloads (e.g., BGP Ethernet VPN (EVPN)-based application workload connectivity or other suitable types of overlay connectivity for tenant workloads). The controller 120 may be configured to support workload intent that accommodates various quality-of-service (QoS) and security policies on a per-application workload. The controller 120 may be configured to support various other functions for supporting abstracted fabric and workload intent.

The controller 120 may be configured to support fabric design intent (which also may be referred to as Day 0 design). The controller 120 may be configured to support fabric design intent by taking an abstract, intent-based approach and enabling the data center operator to focus on high-level intent, which is to identify the minimal information needed to build data center fabrics (e.g., the number of racks and the number of servers per rack, or other basic information which may be used to build data center fabrics). The controller 120 may be configured to use such minimal information to auto-generate the rest of the configuration of the data center fabric (e.g., detailed cable connections, port configurations, interface configurations, network underlay connections, and so forth). The controller 120 may be configured to use fabric design intent to enable a modular approach of building multiple leaf-spine fabrics in a data center and connecting them via a backbone fabric. The controller 120, based on support for this modular way of expressing fabric intent and use of design templates, may be configured to support customization per fabric. For example, the controller 120, based on support for this modular way of expressing fabric intent and use of design templates, may be configured to support auto-generation of the configuration needed to build a standard BGP-based IP fabric or other suitable type of fabric. The controller 120 may be configured to support various other functions for supporting fabric design intent.

The controller 120 may be configured to support application workload intent. After the fabric is built, the next logical step for a data center operator is provide reachability across the data center fabric so that the data center operator can onboard application workloads. The reachability across the data center fabric for supporting application workloads may be provided using various protocols, services, or the like, as well as various combinations thereof. For example, applications may utilize Layer 2 or Layer 3 reachability across the data center fabric for application workloads. For example, a standard and interoperable BGP EVPN-based implementation may be used to deliver multi-homed link aggregation group (LAG), Layer 2, or Layer 3 services within and across data centers; however, enabling BGP EVPN-based Layer 2/Layer 3 EVPNs in a data center fabric typically requires many variables to be configured (e.g., although EVPN is a standardized protocol, it often takes an advanced skillset and significant effort to correctly configure EVPNs for hundreds of workloads). The controller 120 may be configured to simplify configuration of such BGP EVPN-based reachability based on an abstract intent-based approach that enables the data center operator to focus on high-level intent, which is to identify the set of downlinks an application workload uses to connect to the fabric. For example, complexities such as switch-to-switch EVPN and allocation of VXLAN network identifiers, route distinguishers, route targets, Ethernet segment IDs and Ethernet virtual interfaces are left to the controller 120, which automates the EVPN connectivity for application workloads. For example, the automated EVPN fabric may expose simplified Layer 2 and Layer 3 services described as a set of downlinks or sub-interfaces. It will be appreciated that various other types of reachability based on various other protocols and services, some of which may be complicated to configure, also may be used for reachability in data center fabrics and that the controller 120 may be configured to simplify configuration of such reachability based on the abstract intent-based approach. The controller 120 may be configured to support various other functions for supporting application workload intent.

The controller 120 may be configured to support tracking of management of intent deviation. The controller 120 may be configured to support tracking of intent-deviation and associated intent-deviation alerts. The controller 120 may be configured to support advanced auditing and alerts for intent deviation. The controller 120, given that fabric intent and workload intent trigger automated provisioning of various features on data center fabrics, may be configured to continuously monitor fabric intent and workload intent to ensure that the current configuration and operational state of the data center fabric is aligned with the desired state defined as intent by the controller 120. The controller 120, based on a determination that the network configuration or state does not reflect the design defined by the intent, may be configured to generate deviation information indicative of such deviations and such deviation information may be used in various ways (e.g., stored for use in performing management functions for management of the data center fabric, provided to one or more operations support systems, displayed visually to one or more users (e.g., in an intent alert log or other suitable representation), or the like, as well as various combinations thereof. The controller 120 may be configured to permit users to accept or reject deviations as the new desired state. The controller 120, where deviation of a configuration is expected or acceptable, such as for troubleshooting or during upgrades, may be configured to provide alert snooze functionality, which stops notification of an alert for a certain amount of time. The controller 120 may be configured to support various other functions for supporting management of intent deviation.

The controller 120 may be configured to provide control functions for the data center fabric 110 based on support for fabric observability. The controller 120 may be configured to support fabric observability through a combination of telemetry and log data collected from the data center fabric, which may provide visibility into east-west traffic and north-south traffic in the fabric. For example, the controller 120 may be configured to constantly receive network state and statistics as telemetry data (e.g., via a gNMI interface or other suitable types of interfaces). The controller 120 may be configured to support a cloud-native scale-out collector architecture to ensure that collection capabilities are highly distributed. For example, the controller 120 may be configured to use an open time series database (TSDB), that naturally fits into a cloud-native framework (e.g., a Kubernetes framework or other suitable framework), for maintaining defined metrics determined based on telemetry data. The controller 120 may be configured to perform correlations, based on collected metrics, to provide insights, including time series insights, to the data center operator. The controller 120 may be configured to interface with a pluggable alerting infrastructure to generate and distribute useful alerts related to the data center fabric. The controller 120 may be configured to support various other functions for supporting fabric observability.

The controller 120 may be configured to provide control functions for the data center fabric 110 based on support for fabric operations. The controller 120 may be configured to support fabric operations in a manner that provides an ability to combine design intent with telemetry data collected from the fabric and to present the data in a context relevant to the operational task. The controller 120 may be configured to support an approach of contextual operational views that enable support for various management functions, such as accurately performing capacity planning actions, efficiently debugging functions or performance issues, or the like, as well as various combinations thereof. The controller 120 may be configured to use such contextual views in order to enable operations teams to deliver agility with confidence and remove barriers between cross-functional teams. The controller 120 may be configured to support use of various open tools (e.g., Grafana, Kibana, or the like) to render and display useful metrics and logs. The controller 120 may be configured to support use of customized screens to display various combinations of configuration and telemetry data. The controller 120 may be configured to identify and process multi-dimensional insights even in the presence of huge amounts of raw collected data as well as processed data which may be available in the operations database. The controller 120 may be configured to use various machine learning techniques, operating on various types of data maintained within the operations database, to perform various functions such as baselining, anomaly detection, predictive analytics, or the like, as well as various combinations thereof. The controller 120 may be configured to support various other functions for supporting fabric operations.

The controller 120 may be configured to provide control functions for the data center fabric 110 based on support for fabric integrations. The controller 120 may be configured to support a flexible, cloud-native approach for integration in customer environments, thereby resulting in faster, customized integration. The controller 120 may be configured to support integration with various compute virtualization solutions, software-defined storage solutions, or the like, as well as various combinations thereof. The controller 120 may be configured to support hybrid clouds with integration into cloud environments, thereby enabling hybrid workload intent to be applied through policy translation to application workloads running in the cloud and on-premises and, thus, delivering consistent policies across a hybrid cloud deployment. The controller 120 may be configured to support firewalls and load balancer services via policies modeled through workload intent. For example, the controller 120 may be configured to support tight integrations with vendor firewall and load balancer via various northbound application programming interfaces (APIs), thereby enabling an automated data center for various services. The controller 120 may be configured to support various other functions for supporting fabric integrations.

The controller 120 may be configured to support management of the data center fabric 110 based on management of network underlays and network overlays of tenants which utilize the network underlays. The controller 120 may be configured to support management of the data center fabric 110 based on separate management of the network underlay and the network overlay. The controller 120 may support separate management of the network underlay and the network overlay by different teams of the data center operator (e.g., a network underlay operations management team for management of the network underlay and a network overlay operations management team for management of the network overlay). The controller 120 may support separate management of the network underlay and the network overlay based on use of a network underlay microservice to support management of the network underlay and use of a network overlay microservice to support management of the network overlay. The controller 120 may be configured to support management of the data center fabric 110, based on management of network underlays and network overlays of tenants which utilize the network underlays, in various other ways.

The controller 120 may be configured to support a capability for configuring the fabric network 111 of the data center fabric 110 based on merging and unmerging of underlay configurations and overlay configurations. The controller 120 may configure the fabric network 111 of the data center fabric 110 by, for each of the switches 112 of the fabric network 111, determining a merged network configuration for the switch 112 and providing the merged network configuration to the switch 112 for configuring the switch to support the merged network configuration. The controller 120 may determine the merged network configuration for the switch 112 by determining a network underlay configuration on the switch 112 for a network underlay of the fabric network 111, determining a network overlay configuration on the switch 112 for a network overlay of the fabric network 111, and generating the merged network configuration for the switch 112 based on merging of network underlay configuration on the switch 112 for the network underlay of the fabric network 111 and the network overlay configuration on the switch 112 for the network overlay of the fabric network 111. The controller 120 may determine the network underlay configuration on the switch 112 as a combination of network underlay configurations for any network underlay connections supported on the switch (e.g., configuration information for the NUCs 113-11 and 113-12 on the leaf switch 112-L1, configuration information for the NUCs 113-11 and 113-21 on the spine switch 112-S1, configuration information for the NUCs 113-12 and 113-22 on the spine switch 112-S2, and configuration information for the NUCs 113-21 and 113-22 on the leaf switch 112-L2). The controller 120 may determine the network overlay configuration on the switch 112 as a combination of network overlay configurations for any tenants having network overlay connections 118 supported on the switch 112 (e.g., configuration information for the NOCs 118-1 and 118-2 on each of the leaf switches 112-L and potentially on the spine switches 112-S depending on implementation of the NOCs 118 (e.g., where the NOCs 118 are tunnels the spine switches 112-S may simply see the NOCs 118 as IP flows). It will be appreciated that various example embodiments of the capability for configuring a fabric network of a data center fabric based on merging and unmerging of underlay configurations and overlay configurations may be further understood by way of reference to FIGS. 2-4.

The controller 120 may be configured to support a capability for debugging the fabric network 111 of the data center fabric 110 based on use of probes in the fabric network 111 of the data center fabric 110. The controller 120 may be configured to debug the fabric network 111 of the data center fabric 110 for various types of problems or potential problems (e.g., traffic loss conditions, traffic black hole conditions, or the like). The controller 120 may be configured to debug the fabric network 111 of the data center fabric 110 based on minimal input information (e.g., source and/or destination endpoints (e.g., VMs 116 and/or servers 115)) with which a problem or potential problem to be debugged is associated. The controller 120 may be configured to debug the fabric network 111 of the data center fabric 110 based on network-wide relationship information indicative of paths taken by packets between endpoints in the data center fabric 110 (e.g., VMs 116 and/or servers 115). The controller 120 may be configured to generate the network-wide relationship information indicative of paths taken by packets between endpoints in the data center fabric 110 based on various types of information available to the controller 120 (e.g., merged network configuration information for the switches 112, network overlay configuration information for switches 112, network underlay configuration information for switches 112, or the like, as well as various combinations thereof). The controller 120 may be configured to use the network-wide relationship information indicative of paths taken by packets between endpoints in the data center fabric 110 to determine probe injection and extraction points for probe packets used to perform probing for supporting debugging the fabric network 111 of the data center fabric 110. The controller 120 may be configured to determine, based on network-wide relationship information indicative of paths taken by packets between endpoints in the data center fabric 110, a probe injection point within the fabric network 111 and a set of probe extraction points within the fabric network 111, initiate injection of a probe packet at the probe injection point (e.g., by sending a probe injection command to a switch 112 on which the probe injection point is located), monitor for detection of the probe packet at the set of probe extraction points (e.g., by monitoring for probe response messages from one or more switches 112 on which the probe extraction points are located), and perform a management action based on whether the probe packet is detected at any of the probe extraction points. The controller 120 may be configured to recursively determine sets of probe injection and extraction points, based on the network-wide relationship information and results of previous probe packet injection tests, for debugging the fabric network 111 of the data center fabric 110. It will be appreciated that various example embodiments of the capability for debugging a fabric network of a data center fabric based on use of probes in the fabric network of the data center fabric may be further understood by way of reference to FIGS. 5-8.

It will be appreciated that the controller 120 may be configured to support management of the data center fabric 110 based on various other data center management capabilities.

Figure 2:
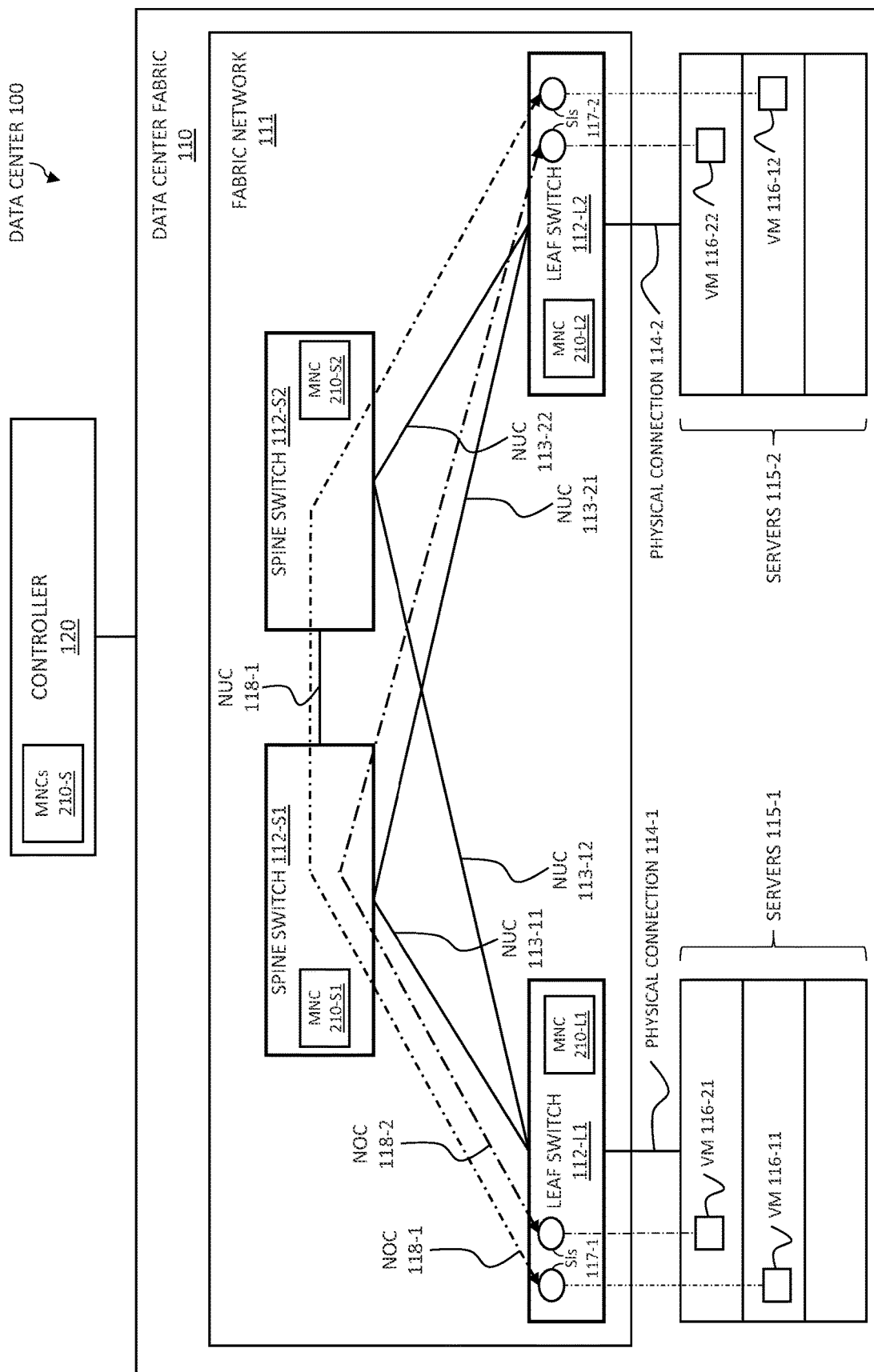
FIG. 2 depicts an example embodiment of the data center of FIG. 1 for illustrating a capability for configuring a fabric network of the data center fabric based on merging and unmerging of underlay and overlay configurations.

FIG. 2 depicts an example embodiment of the data center of FIG. 1 for illustrating a capability for configuring a fabric network of the data center fabric based on merging and unmerging of underlay and overlay configurations.

In FIG. 2, the controller 120 may be configured to support a capability for configuring the fabric network 111 of the data center fabric 110 based on merging and unmerging of underlay configurations and overlay configurations. The controller 120 may configure the fabric network 111 of the data center fabric 110 by, for each of the switches 112 of the fabric network 111, determining a merged network configuration for the switch 112 and providing the merged network configuration to the switch 112 for configuring the switch to support the merged network configuration. The controller 120 may determine the merged network configuration for the switch 112 by determining a network underlay configuration on the switch 112 for a network underlay of the fabric network 111, determining a network overlay configuration on the switch 112 for a network overlay of the fabric network 111, and generating the merged network configuration for the switch 112 based on merging of network underlay configuration on the switch 112 for the network underlay of the fabric network 111 and the network overlay configuration on the switch 112 for the network overlay of the fabric network 111.

In FIG. 2, the merged network configurations for the switches are illustrated as merged network configurations 210 (illustratively, merged network configuration 210-T1 on leaf switch 112-L1, merged network configuration 210-T2 on leaf switch 112-L2, merged network configuration 210-S1 on spine switch 112-S1, and merged network configuration 210-S2 on spine switch 112-S2, all of which are maintains as merged network configurations 210-C on the controller 120). The merged network configuration 210-T1 on the leaf switch 112-L1, for example, includes the configuration information for the NUCs 113-11 and 113-12 on the leaf switch 112-L1 and the configuration information for the NOCs 118 that terminate on the leaf switch 112-L1. The merged network configuration 210-T1 on the leaf switch 112-L2, for example, includes the configuration information for the NUCs 113-21 and 113-22 on the leaf switch 112-L2 and the configuration information for the NOCs 118 that terminate on the leaf switch 112-L2. The merged network configuration 210-S1 on spine switch 112-S1, for example, includes the configuration information for the NUCs 113-11 and 113-21 on the spine switch 112-S and, optionally, depending on the connection types of the NOCs 118 that traverse the spine switch 112-S1, configuration information for the NOCs 118 that traverse the spine switch 112-S1. The merged network configuration 210-S1 on spine switch 112-S2, for example, includes the configuration information for the NUCs 113-21 and 113-22 on the spine switch 112-S2 and, optionally, depending on the connection types of the NOCs 118 that traverse the spine switch 112-S2, configuration information for the NOCs 118 that traverse the spine switch 112-S2. The merged network configurations 210-C on the controller 210 may include each of the merged network configurations implemented within the fabric network 111 (illustratively, the merged network configurations 210-L on the leaf switches 112-L and the merged network configurations 210-S on the spine switches 112-S since the controller 120 determines these merged network configurations and configures the switches 112 to support these merged network configurations for supporting workloads of tenants supported by the servers 115 of the data center fabric 110).

In FIG. 2, as indicated above, the fabric network 111 may be configured to support the workloads of the tenants by, for each of the switches 112 of the fabric network 111, computing a merged network configuration for the switch 112 and sending the merged network configuration for the switch 112 to the switch 112 to configure the switch 112 to support the merged network configuration. The computation of the merged network configurations for the switches 112 of the fabric network 111 may be performed in various ways.

The merged network configuration for a given switch 112 may be computed based on a merge of an underlay configuration at the switch 112 and an overlay configuration at the switch 112, where the overlay configuration at the switch 112 is a summation of the overlay configurations of each of the tenants supported by the switch 112. It will be appreciated that, here, summation of the overlay configurations of each of the tenants supported by the switch 112 also may be referred to as a summation of the workloads of each of the tenants supported by the switch 112. For example, the computation of the merged network configuration for a given switch 112 may be represented as: $M = UL + \Sigma_{j=1}^{m} WL_j$, where M represents the merged network configuration, UL represents the underlay configuration at the switch 112, and $\Sigma_{j=1}^{m} WL_j$ represents a summation of the workloads of the m tenants supported by the switch 112. It will be appreciated that the $\Sigma_{j=1}^{m} WL_j$ also may be considered to represent a summation of the workloads of the m tenants supported by the fabric network 111 where any of the workloads of tenants which do not utilize that switch 112 are considered to be zero (which reduces to a summation of the workloads of the m tenants supported by the switch 112).

The merged network configuration for a given switch 112 may be computed based on a merge of an underlay configuration at the switch 112 and an overlay configuration at the switch 112 while also taking into account deviations in the fabric network 111. The deviations in the fabric network 111 may include deviations from intents of the data center operator. For example, the computation of the merged network configuration for a given switch 112 while also taking into account deviations may be represented as: $M = UL + \Sigma_{j=1}^{n} D_i + \Sigma_{j=1}^{m} WL_j$, where M represents the merged network configuration, UL represents the underlay configuration at the switch 112, $\Sigma_{j=1}^{n} D_i$ represents a summation of the n deviations impacting the switch 112, and $\Sigma_{j=1}^{m} WL_j$ represents a summation of the workloads of the m tenants supported by the switch 112. It will be appreciated that the $\Sigma_{j=1}^{n} D_i$ also may be considered to represent a summation of the n deviations in the fabric network 111 where any of the deviations which do not impact that switch 112 are considered to be zero (which reduces to a summation of the n deviations impacting the switch 112). It is noted that although deviations are not included in the examples below (for purposes of clarity), deviations may be accounted for in any such scenarios.

In FIG. 2, the fabric network 111 may be configured to support the workloads of the tenants by, in response to a change in the data center fabric 110, performing the following for each of the switches of the fabric network 111: computing a new merged network configuration for the switch 112 based on an existing merged network configuration for the switch 112 and sending the new merged network configuration for the switch 112 to that switch 112 for configuring that switch 112 to support the new merged network configuration. It will be appreciated that, although primarily presented within the context of example embodiments in which the new merged network configurations are computed and instantiated for each of the switches 112, the new merged network configurations may be computed and instantiated for a subset of the switches 112 based on a determination that only the subset of the switches 112 is impacted by the change in the data center fabric 110.

The new merged network configurations for the switches 112 may be computed for the switches 112 and instantiated in the switches 112 in response to various types of changes. For example, changes to the network overlay may trigger computation and instantiation of new merged network configurations for switches 112, such as a removal of an existing tenant from the data center fabric 110 (e.g., where each of the VMs of the existing tenant are terminated and removed from the servers 115 of the data center fabric 110), modification of an existing tenant of the data center fabric 110 (e.g., modification of one or more aspects of a service of the tenant, removal of an existing VM or instantiation of a new VM for the tenant, or the like, as well as various combinations thereof), addition of a new tenant to the data center fabric 110, or the like, as well as various combinations thereof. For example, changes to the network overlay may trigger computation and instantiation of new merged network configurations for switches 112, such as a failure of a switch 112 or portion of a switch 112 (e.g., a port, an interface or the like), a failure or degradation of a communication link between switches 112, or the like, as well as various combinations thereof.

The new merged network configuration for a given switch 112 may be computed based use of an existing merged network configuration for the switch 112 as a starting point and then unmerging an existing overlay configuration at the switch 112 from the existing merged network configuration for the switch 112 and merging a new overlay configuration at the switch 112 to the existing merged network configuration for the switch 112. Here, the existing overlay configuration at the switch 112 is the overlay configuration at the switch 112 prior to the change which triggers the new merged network configuration for the switch 112 (e.g., a summation of the overlay configurations of each of the tenants supported by the switch 112 prior to the change) and the new overlay configuration at the switch 112 is the overlay configuration at the switch 112 after the change which triggers the new merged network configuration for the switch 112 (e.g., a summation of the overlay configurations of each of the tenants supported by the switch 112 after to the change). For example, computation of the new merged network configuration for a switch 112 based on the existing merged network configuration for the switch 112 and the change which triggers the new merged network configuration for the switch 112 may be represented as: $M_{new} = M_{existing} - OL_{existing} + OL_{new}$, where $M_{new}$ represents the new merged network configuration at the switch 112, $M_{existing}$ represents the existing merged network configuration at the switch 112, $OL_{existing}$ represents the existing overlay configuration at the switch 112 prior to the change, and $OL_{new}$ represents the new overlay configuration at the switch after the change. It is noted that computation of a new merged network configuration at a switch based on a change to the data center fabric 110 may be further understood by way of reference to the following examples.

For example, in the case where the tenant T2 is removed from the data center fabric 110 (e.g., the VMs for the tenant T2 are no longer needed by the tenant T2 and, thus, the VMs for the tenant T2 are terminated), the new merged network configuration for a given network element may be computed as: $M_{new} = M_{existing} - OL_{T2\text{-}existing} + OL_{T2\text{-}new}$, where $OL_{T2\text{-}existing}$ is the existing overlay configuration for the tenant T2 on the network element and $OL_{T2\text{-}new}$ is the new overlay configuration for the tenant T2 on the network element, which also may be written as $M_{new} = M_{existing} - OL_{T2\text{-}existing}$ since $OL_{T2\text{-}new}$ is empty (i.e., there is no more $OL_{T2}$ since T2 is being removed). It will be appreciated that this determination of the new merged network configuration may be repeated for each of the network elements of the fabric network of the data center (i.e., each of the switches 112).

The new merged network configurations for the network elements may then be downloaded into the fabric network 111 in order to reconfigure the fabric network 111 to reflect the removal of tenant T2.

For example, in the case where the tenant T2 is modified within the data center fabric 110 (e.g., there is a change to one or more of the VMs for the tenant T2), the new merged network configuration for a given network element may be computed as: $M_{new}=M_{existing}-OL_{T2\text{-}existing}+OL_{T2\text{-}new}$, where $OL_{T2\text{-}existing}$ is the existing overlay configuration for the tenant T2 on the network element and $OL_{T2\text{-}new}$ is the new overlay configuration for the tenant T2 on the network element. It will be appreciated that this determination of the new merged network configuration may be repeated for each of the network elements of the fabric network of the data center (i.e., each of the switches 112). The new merged network configurations for the network elements may then be downloaded into the fabric network 111 in order to reconfigure the fabric network 111 to reflect the modification for tenant T2.

For example, in the case where a new tenant T3 comes online within the data center fabric 110 (e.g., a new pair of VMs is instantiated for the new tenant T3), the new merged network configuration for a given network element may be computed as: $M_{new}=M_{existing}-OL_{T3\text{-}existing}+OL_{T3\text{-}new}$, where $OL_{T3\text{-}existing}$ is the existing overlay configuration for the tenant T3 on the network element (i.e., this configuration would be empty as the tenant T3 did not previously exist in the data center fabric 110 and $OL_{T3\text{-}new}$ is the new overlay configuration for the tenant T3 on the network element. It will be appreciated that this determination of the new merged network configuration may be repeated for each of the network elements of the fabric network of the data center (i.e., each of the switches 112). The new merged network configurations for the network elements may then be downloaded into the fabric network 111 in order to reconfigure the fabric network 111 to reflect the addition of tenant T3.

It will be appreciated that, although primarily presented with respect to reconfiguration of the fabric network 111 based on specific types of changes to the data center fabric 110, the fabric network 111 may be reconfigured, based on use of configuration merge and unmerge operations, in response to various other types of changes to the data center fabric 110.

Figure 3:
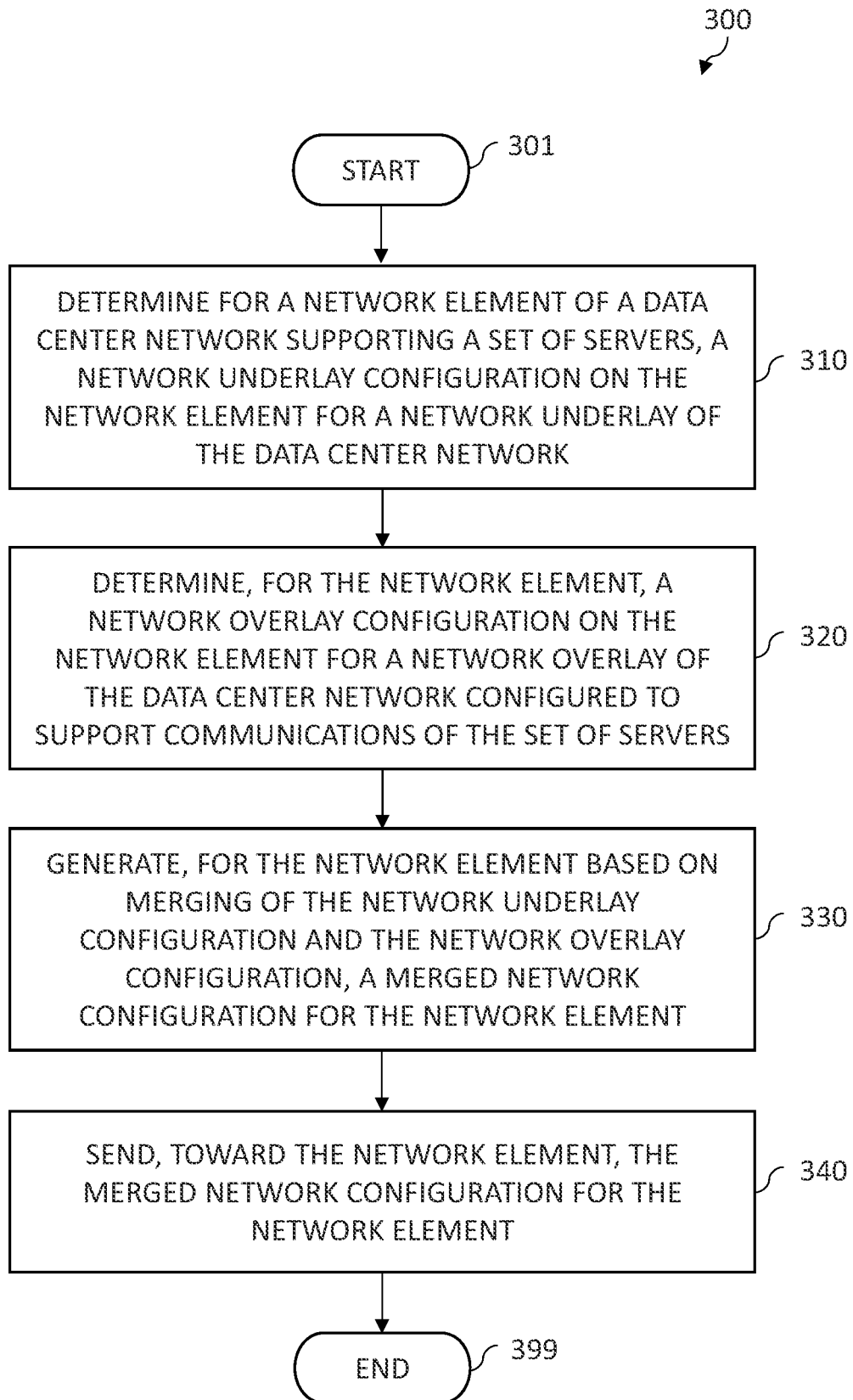
FIG. 3 depicts an example embodiment of a method for use by a controller for supporting configuration of a fabric network of a data center fabric based on merging and unmerging of underlay and overlay configurations.

FIG. 3 depicts an example embodiment of a method for use by a controller for supporting configuration of a fabric network of a data center fabric based on merging and unmerging of underlay and overlay configurations. It will be appreciated that, although primarily presented as being performed serially, at least a portion of the functions of method 300 may be performed contemporaneously or in a different order than as presented with respect to FIG. 3. At block 301, method 300 begins. At block 310, determine for a network element of a data center network supporting a set of servers, a network underlay configuration on the network element. At block 320, determine, for the network element, a network overlay configuration on the network element for a network overlay of the data center network configured to support communications of the set of servers. At block 330, generate, for the network element based on merging of the network underlay configuration and the network overlay configuration, a merged network configuration for the network element. At block 340, send, toward the network element, the merged network configuration for the network element. At block 399, method 300 ends.

Figure 4:
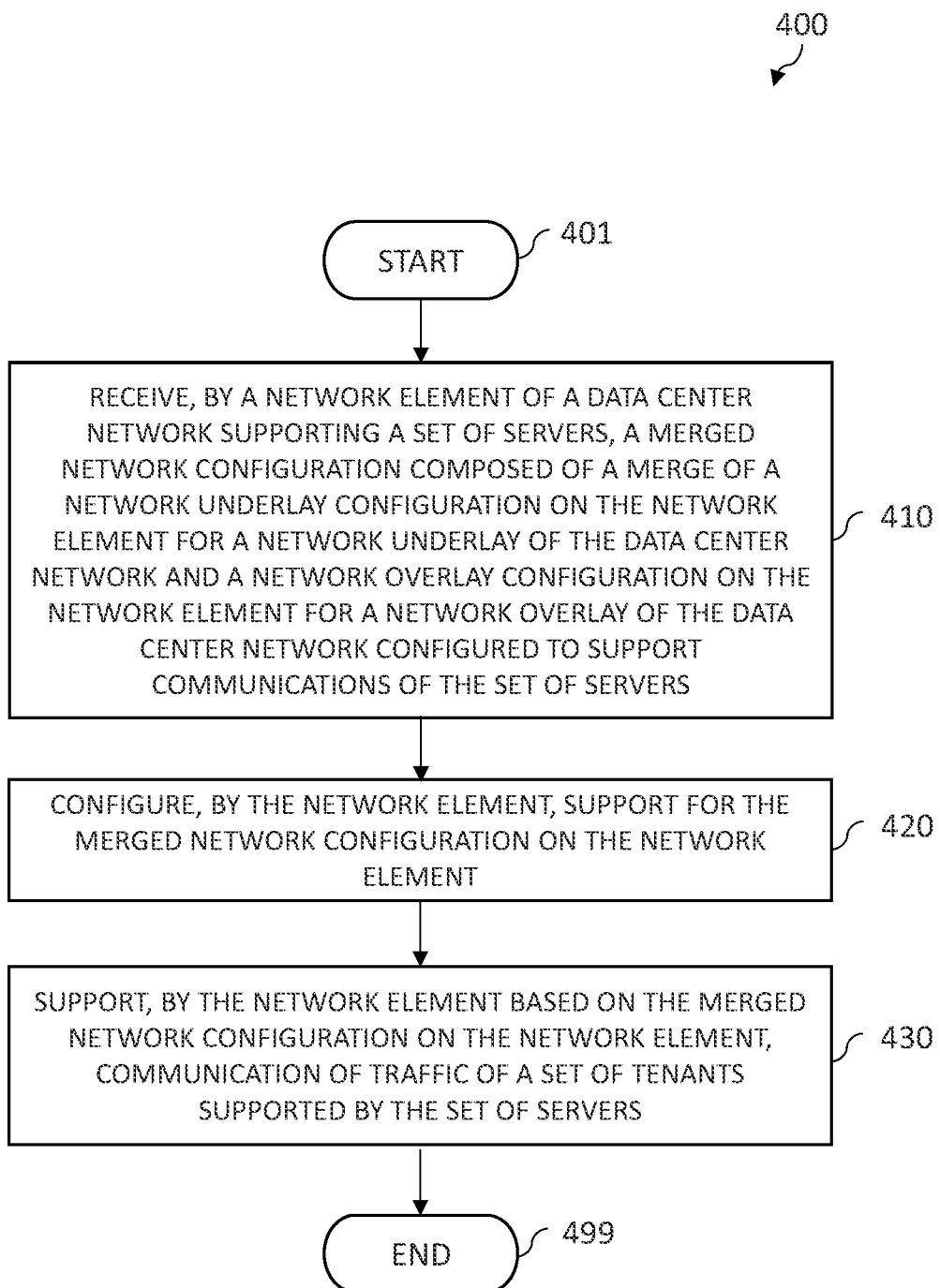
FIG. 4 depicts an example embodiment of a method for use by a network element for supporting configuration of a fabric network of a data center fabric based on merging and unmerging of underlay and overlay configurations.

FIG. 4 depicts an example embodiment of a method for use by a network element for supporting configuration of a fabric network of a data center fabric based on merging and unmerging of underlay and overlay configurations. It will be appreciated that, although primarily presented as being performed serially, at least a portion of the functions of method 400 may be performed contemporaneously or in a different order than as presented with respect to FIG. 4. At block 401, method 400 begins. At block 140, receive, by a network element of a data center network supporting a set of servers, a merged network configuration composed of a merge of a network underlay configuration on the network element for a network underlay of the data center network and a network overlay configuration on the network element for a network overlay of the data center network configured to support communications of the set of servers. At block 150, configure, by the network element, support for the merged network configuration on the network element. At block 430, support, by the network element based on the merged network configuration on the network element, communication of traffic of a set of tenants supported by the set of servers. At block 499, method 400 ends.

It will be appreciated that various other functions for configuring a data center fabric based on merging and unmerging of underlay and overlay configurations may be supported.

Figure 5:
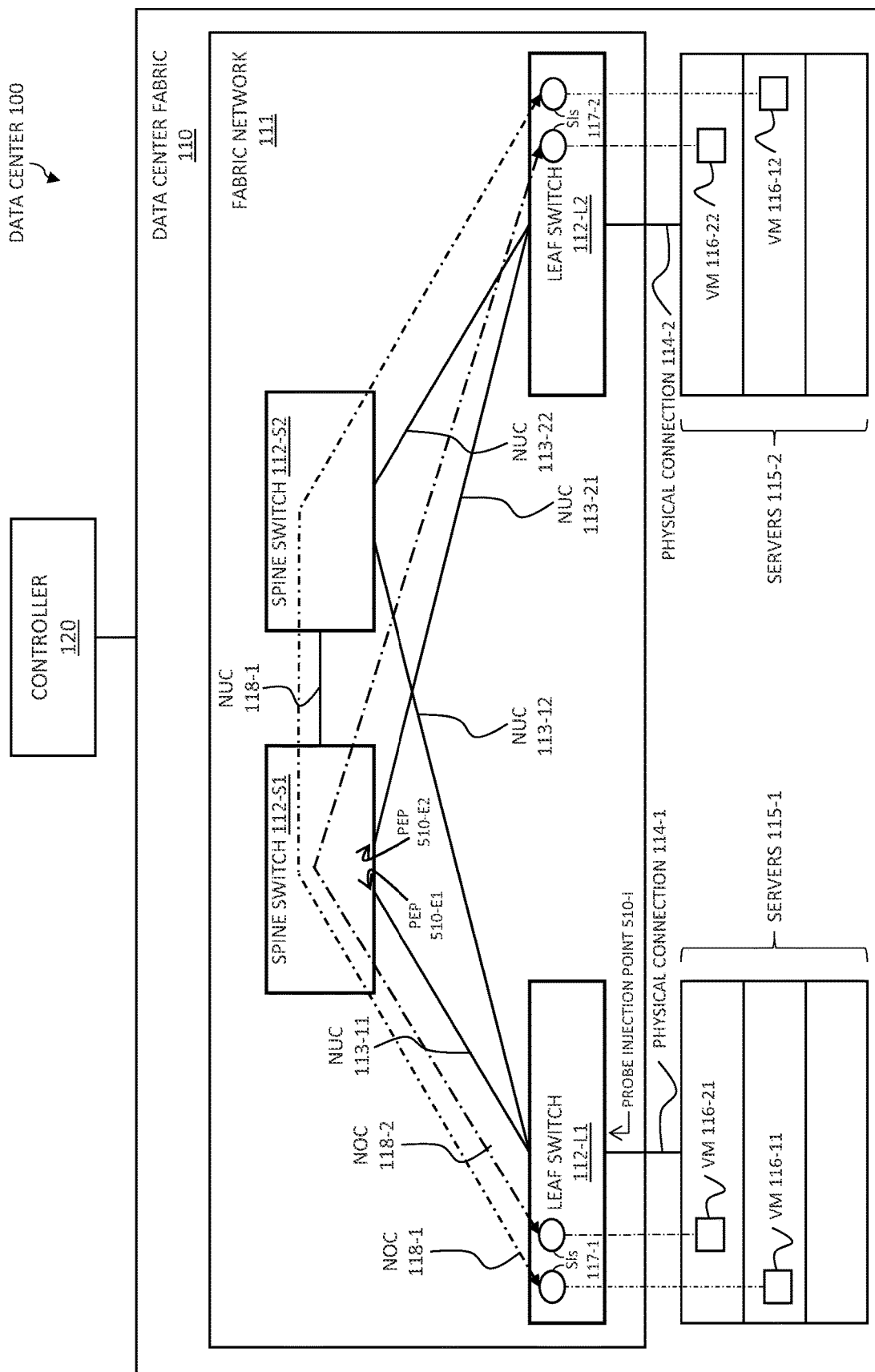
FIG. 5 depicts an example embodiment of the data center of FIG. 1 for illustrating a capability for debugging a fabric network of a data center fabric based on use of probes in the fabric network of the data center fabric.

FIG. 5 depicts an example embodiment of the data center of FIG. 1 for illustrating a capability for identifying and diagnosing problems or potential problems in a data center fabric based on use of probes in a fabric network of the data center fabric.

In FIG. 5, the controller 120 may be configured to support a capability for debugging the fabric network 111 of the data center fabric 110 based on use of probes in the fabric network 111 of the data center fabric 110. The controller 120 may be configured to debug the fabric network 111 of the data center fabric 110 for various types of problems or potential problems (e.g., traffic loss conditions, traffic black hole conditions, or the like). The controller 120 may be configured to debug the fabric network 111 of the data center fabric 110 based on minimal input information (e.g., source and/or destination endpoints (e.g., VMs 116 and/or servers 115)) with which a problem or potential problem to be debugged is associated. The controller 120 may be configured to debug the fabric network 111 of the data center fabric 110 based on network-wide relationship information indicative of paths taken by packets between endpoints in the data center fabric 110 (e.g., VMs 116 and/or servers 115). The controller 120 may be configured to generate the network-wide relationship information indicative of paths taken by packets between endpoints in the data center fabric 110 based on various types of information available to the controller 120 (e.g., merged network configuration information for the switches 112, network overlay configuration information for switches 112, network underlay configuration information for switches 112, or the like, as well as various combinations thereof). The controller 120 may be configured to use the network-wide relationship information indicative of paths taken by packets between endpoints in the data center fabric 110 to determine probe injection and extraction points for probe packets used to perform probing for supporting debugging the fabric network 111 of the data center fabric 110. The controller 120 may be configured to determine, based on network-wide relationship information indicative of paths taken by packets between endpoints in the data center fabric 110, a probe injection point within the fabric network 111 and a set of probe extraction points within the fabric network 111, initiate injection of a probe packet at the probe injection point (e.g., by sending a probe injection command to a switch 112 on which the probe injection point is located), monitor for detection of the probe packet at the set of probe extraction points (e.g., by monitoring for probe response messages from one or more switches 112 on which the probe extraction points are located), and perform a management action based on whether the probe packet is detected at any of the probe extraction points.

The controller 120 may be configured to perform the debugging based on the network-wide relationship information, which may include relationship information indicative of mappings of network overlay connections 118 to network underlay connections 113. The controller 120 may build the relationship information based on network underlay configuration information for the network underlay connections 113, network overlay connection information for the network overlay connections 118, merged network configuration information generated by the controller 120 for configuring the switches 112 to support the network underlay connection 113 and the network overlay connection 118, or the like, as well as various combinations thereof. The controller 120 may build the relationship information for tracking paths of the network overlay connections 118 over the network underlay connections 113. The controller 120 may build the relationship information in the form of data structures configured to simplify tracking of problem locations in the fabric network 111 (e.g., since there may be problem inside the network overlay or anywhere outside the network overlay including in the network underlay). The controller 120 may build and maintain the relationship information such that, for any prefix which may be supported on a network overlay connection 118, the possible network paths taken by the prefix are known and probe packets may be introduced at probe injection points and tracked for identifying the probe packets at associated probe extraction points. The controller 120 may be configured to build and maintain the relationship information for guiding injection, tracking, and extraction of probe packets, for determining paths taken by probe packets over the network underlay as the packets traverse the network overlay, supporting debugging within the data center fabric 110. The controller 120 may be configured to perform the debugging based on network-wide relationship information determined in various other ways, based on various other types of network-wide relationship information, or the like, as well as various combinations thereof.

The controller 120 may be configured to perform the debugging based on the network-wide relationship information. The controller 120 may be configured to use information collected based on use of the network-wide relationship information to support probing operations within the fabric network 111 to perform debugging for problems or potential problems in the fabric network 111 (e.g., identifying locations of problems or potential problems in the fabric network 111, determining the root causes of problems or potential problems in the fabric network 111, or the like, as well as various combinations thereof). The controller 120 may be configured to use information collected based on injection and extraction of probe packets to identify the locations of problems or potential problems in the fabric network 111. The controller 120 may be configured to use information collected based on injection and extraction of probe packets to determine the root cause of problems or potential problems in the fabric network 111. For example, if a probe packet is inserted at an input to a switch 112 and is not detected at any extraction points associated with outputs from the switch 112 then the problem may be isolated to that switch 112 and further debugging may be performed on the switch 112 to identify the root cause of the problem on that switch 112 (e.g., queues are overflowing, faulty hardware, or any other problems which may result in problems). For example, if a probe packet is inserted at an input to a first switch 112 and is detected at an extraction point associated with a second switch 112 then the problem may be isolated to the first switch 112 that caused the probe packet to be routed to the second switch 112 (instead of a different switch 112 to which the probe packet should have been routed) and further debugging may be performed on the switch 112 to identify the root cause of the problem on that switch 112 (e.g., queues are overflowing, faulty hardware, or any other problems which may result in problems). The controller 120 may be configured to perform the debugging, based on the network-wide relationship information, in various other ways.

The controller 120 may be configured to perform the debugging based on use of probing based on the network-wide relationship information. The controller 120 may be configured to perform debugging of the fabric network 111, based on use of probes, by identifying a probe injection point within the fabric network 111 and a set of probe extraction points within the fabric network 111, controlling injection of a probe packet at the probe injection point and monitoring for the probe packet at the set of probe extraction points, and performing one or more management functions based on the injection of a probe packet at the probe injection point and the monitoring for the probe packet at the set of probe extraction points.

The controller 120 identifies a probe injection point at which a probe packet is to be injected and a set of probe extraction points at which the probe packet is expected to be received and performs probe-based testing based on the probe injection point at which the probe packet is to be injected and the set of probe extraction points at which the probe packet is expected to be received.

The controller 120 may identify the probe injection point and the set of probe extraction points in response to various conditions. For example, the controller 120 may identify the probe injection point and the set of probe extraction points based on a request from a tenant of the data center 100 (e.g., a request for information, a request for evaluation of a service, or the like). For example, the controller 120 may identify the probe injection point and the set of probe extraction points based on input information related to a problem or potential problem in the data center fabric (e.g., packet source and/or destination information for a tenant experiencing a problem or potential problem). For example, the controller 120 may identify the probe injection point and the set of probe extraction points based on an indication of a problem or potential problem in the data center fabric 110 (e.g., a problem type of the problem, a location of the problem, or the like, as well as various combinations thereof). It will be appreciated that the controller 120 may identify the probe injection point and the set of probe extraction points in response to various other conditions.

The controller 120 may identify the probe injection point and the set of probe extraction points in various ways. For example, the probe injection point and the set of probe extraction points may be specified to the controller 120 (e.g., by the tenant where the probe is initiated based on a request from a tenant of the data center 100, by an operations support systems where the probe is initiated based on a request from the operations support system, or the like). For example, the probe injection point may be specified to the controller 120 and the set of probe extraction points may be determined by the controller 120 (e.g., based on the probe injection point, based on network topology information, based on service topology information, or the like, as well as various combinations thereof). For example, the probe injection point and the set of probe extraction points may be determined by the controller 120 (e.g., based on information related to a service for which the probe is performed, based on information indicative of a problem or potential problem in the fabric network 110, based on network topology information, based on service topology information, or the like, as well as various combinations thereof). It will be appreciated that the controller 120 may identify the probe injection point and the set of probe extraction points in various other ways.

The controller 120 may perform the probe-based testing, based on the probe injection point at which the probe packet is to be injected and the set of probe extraction points at which the probe packet is expected to be received, in various ways.

The controller 120 sends a probe injection request to a device associated with the probe injection point. The probe injection request sent to a probe injection device identifies the probe injection point for the probe packet at the probe injection device (e.g., a tunnel endpoint, an interface, a port, or the like). The probe injection request may include instructions for injecting the probe packet at the probe injection point (e.g., instructions for a time at which the probe packet is to be injected at the probe injection point, instructions for generating a probe packet to be injected at the probe injection point, or the like, as well as various combinations thereof). The probe injection request may include the probe packet to be injected at the probe injection point or a portion of the probe packet to be injected at the probe injection point. It will be appreciated that the probe injection request may include various other types of information which may be used by the probe injection device to control injection of the probe packet at the probe injection point.

The controller 120 sends one or more probe extraction requests to one or more devices associated with the probe extraction points, respectively. The probe extraction request received by a probe extraction device identifies one or more probe extraction points for the probe packet at the probe extraction device (e.g., a tunnel endpoint, an interface, a port, or the like). The probe extraction request may include instructions for monitoring for the probe packet at the one or more probe extraction points (e.g., instructions for monitoring for the probe packet (e.g., an indication of an element with which the probe packet is associated (e.g., a tunnel, a flow, or the like), a signature of the probe packet which may be used to distinguish the probe packet from other packets traversing the device, or the like), instructions for a time at which the probe packet is expected to be received at the one or more probe extraction points and/or for a range of time during which the probe extraction point may be received at the one or more probe extraction points, or the like, as well as various combinations thereof). The probe extraction request may include instructions for sending a probe extraction response from the probe extraction device to the controller 120. It will be appreciated that the probe injection response sent by a probe extraction device may include various other types of information which may be used by the probe extraction device to monitor for the probe packet at the one or more probe extraction points and to send the probe extraction response from the probe extraction device to the controller 120.

The controller 120 receives one or more probe extraction responses in response to the one or more probe extraction requests. The devices receive the probe-related requests from the controller 120 and perform functions for controlling execution of the probe-based testing. The probe injection device that receives the probe injection request from the controller 120 injects the probe packet at the probe injection point based on the probe injection request. The one or more probe extraction devices that receive a probe extraction request from the controller 120 each monitor for the probe packet at one or more probe extraction points based on the probe extraction request and send a probe extraction response to the controller 120. The probe extraction response sent by a probe extraction device includes information indicative of the results of monitoring for the probe packet at the one or more probe extraction points (e.g., an indication as to whether or not the probe packet was received at one of the probe extraction points, an indication of a time at which the probe packet was received if received via one of the probe extraction points, or the like, as well as various combinations thereof). It will be appreciated that the probe extraction response sent by a probe extraction device may include various other types of information which may be collected by the probe extraction device and sent by the probe extraction device to the controller 120.

The controller 120 may perform one or more management functions based on the probe request and the one or more probe extraction responses. For example, the controller 120 may raise an alarm to one or more support systems, such as an operations support system (OSS), a business support system (BSS), or the like. For example, the controller 120 may raise an alarm to one or more support personnel (e.g., via one or more messages to one or more devices of the one or more support personnel). For example, the 120 may initiate one or more additional tests in the data center fabric 110, including one or more additional probe-based tests. For example, the controller 120 may perform analysis for identifying a problem or potential problem (e.g., root cause analysis or other suitable types of analysis). For example, the controller may perform one or more corrective actions for correcting a problem or potential problem. It will be appreciated that the controller 120 may perform various other management functions for the data center fabric 110 based on the probe request and the one or more probe extraction responses.

It will be appreciated that, although primarily presented with respect to use of a single probe packet for supporting evaluation of the data center fabric 110, multiple probe packets may be used for supporting evaluation of the data center fabric 110. For example, multiple probe packets may be injected at a single probe injection point. For example, multiple probe packets may be injected at multiple probe injection points (e.g., the multiple probe packets each being injected at each of the multiple probe injection points, the multiple probe packets being injected respectively at the multiple probe injection points, or the like). It will be appreciated that various other numbers of probe injection packets may be injected at any suitable number of probe injection points and extracted at any suitable number of probe extraction points for supporting evaluation of the data center fabric 110 based on probe packets.

In FIG. 5, the operation of the controller 120 in supporting a capability for debugging the fabric network 111 of the data center fabric 110 based on use of probes in the fabric network 111 of the data center fabric 110 may be further understood from the following example. In this example, assume that the tenant T1 is experience packet loss on NOC 118-1 which, in this example, is a VPN. The tenant T1 requests debugging of the packet loss problem and provides relatively simple input for the debugging in the form of identification of VM 116-11 and VM 116-12 as the traffic source and traffic destination of the traffic flow experiencing the traffic loss condition, respectively. The controller 120 may be configured to automatically perform the debugging based on this relatively simple input. The controller 120, based on the relationship information indicative of mappings of network overlay connections 118 to network underlay connections 113, determines that the VM 116-11 of the tenant T1 is connected to the leaf switch 112-L1. The controller 120, based on the relationship information indicative of mappings of network overlay connections 118 to network underlay connections 113, determines that the leaf switch 112-T1 has a route that points to the network overlay connection 118-1 (e.g., a tunnel), but the controller 120 does not know what is inside the network overlay connection 118-1 (e.g., the tunnel). The controller 120, based on the relationship information indicative of mappings of network overlay connections 118 to network underlay connections 113, determines that the leaf switch 112-T1 also has a route that tracks the network overlay connection 118-1 and that points to spine switches 112-S1 and 112-S2 since ECMP is used by the underlay configuration from leaf switch 112-L1 to spine switches 112-S1 and 112-S2 via NUCs 113-11 and 113-12, respectively. The controller 120 knows that the path taken by the NOC 118-1 (namely, whether over NUC 113-11 or NUC 113-12) is controlled by leaf switch 112-L1 and, thus, to determine whether the NOC 118-1 traverses NUC 113-11 or NUC 113-12, initiates injection of a probe packet on leaf switch 112-L1 (e.g., at the probe injection point 510-I) and monitoring for the probe packet on spine switch 112-S1 (e.g., at the probe extraction point 510-E1) and on the spine switch 112-S2 (e.g., at the probe extraction point 510-E2). The controller 120 may initiate injection of the probe packet on the leaf switch 112-L1 by sending to the leaf switch 112-L1 a message configured to cause the leaf switch 112-L1 to inert the probe packet at the probe injection point 510-I. The controller 120 may initiate monitoring for the probe packet on spine switches 112-S1 and 112-S2 by sending to the spine switches 112-S1 and 112-S2 messages configured to cause the spine switches 112-S1 and 112-S2 to monitor for the probe packet at the probe extraction points 510-E1 and 510-E2, respectively. In the example of FIG. 5, the NOC 118-1 traverses the NUC 113-11, so the spine switch 112-S1 detect the probe packet at the probe extraction points 510-E1 and reports the detection of the probe packet at the probe extraction points 510-E1 to the controller 120. The controller 120 has now determined that the NOC 118-1 traverses spine switch 112-S1. The controller 120 can now recursively continue along the path of the NOC 118-1 for attempting to locate the location of the problem for which debugging was initiated (e.g., initiating a second probe packet at spine switch 112-S1). In this manner, the controller 120 is configured to debug the fabric network 111 of the data center fabric 110 based on use of network-wide relationship information about the fabric network 111 to control probing within the fabric network 111 of the data center fabric 110.

It will be appreciated that the controller 120 may perform debugging of the fabric network 111 of the data center fabric 110, based on use of network-wide relationship information for controlling probing within the fabric network 111 of the data center fabric 110, in various other ways.

Figure 6:
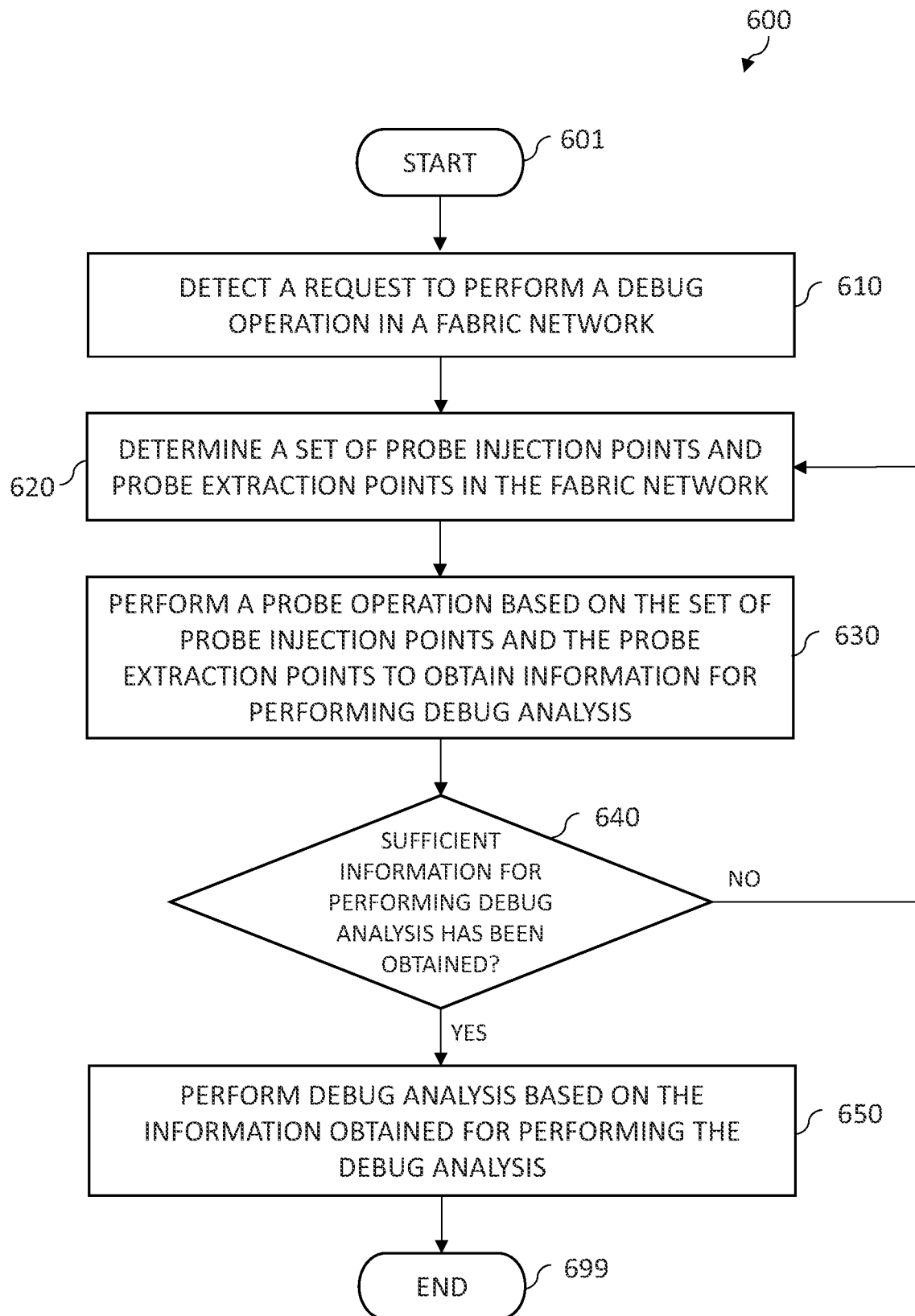
FIG. 6 depicts an example embodiment of a method for use by a controller for supporting debugging of a fabric network of a data center fabric based on use of probes in the fabric network of the data center fabric.

FIG. 6 depicts an example embodiment of a method for use by a controller for supporting debugging of a data center network (e.g., fabric network) of a data center (e.g., data center fabric) based on use of probes in the data center network (e.g., fabric network) of the data center (e.g., data center fabric). It will be appreciated that, although primarily presented as being performed serially, at least a portion of the functions of method 600 may be performed contemporaneously or in a different order than as presented with respect to FIG. 6. At block 601, the method 600 begins. At block 610, detect a request to perform a debug operation in a fabric network. The request to perform the debug operation may be received from a tenant experiencing a problem or potential problem (e.g., a traffic loss condition, a traffic black hole condition, or the like), from an operation support system that has detected a problem or potential problem, or the like. The request to perform the debug operation may have input information associated therewith (e.g., source and destination VMs associated with the problem or potential problem). At block 620, determine a set of probe injection points and probe extraction points in the fabric network. In a first pass through block 620, the set of probe injection points and probe extraction points in the fabric network may be determined based on based on input information associated with the request for the debug operation, network-wide relationship information, or the like, as well as various combinations thereof. In a subsequent pass through block 620, the set of probe injection points and probe extraction points in the fabric network may be determined based on the input information associated with the request for the debug operation, the network-wide relationship information, results associated with previous probe operations performed based on previous sets of probe injection points and probe extraction points, or the like, as well as various combinations thereof. At block 630, perform a probe operation based on the set of probe injection points and the probe extraction points to obtain information for performing debug analysis. At block 640, determine whether sufficient information for performing debug analysis has been obtained. If sufficient information for performing the debug analysis has not been obtained, the method 600 returns to block 620 to determine a next set of probe injection points and probe extraction points in the fabric network (e.g., based on the input information associated with the request for the debug operation, the network-wide relationship information, results associated with previous probe operations performed based on previous sets of probe injection points and probe extraction points in the fabric network, or the like, as well as various combinations thereof) and then block 630 to perform a next probe operation based on the next set of probe injection points and probe extraction points in the fabric network. If sufficient information for performing the debug analysis has been obtained, the method 600 proceeds to block 650. At block 650, perform debug analysis based on the information obtained for performing the debug analysis (which may be obtained in one or more iterations of blocks 620, 630, and 640). The debug analysis may determine the cause of a problem or potential problem which triggered the request to perform the debug operation. At block 699, the method 600 ends.

Figure 7:
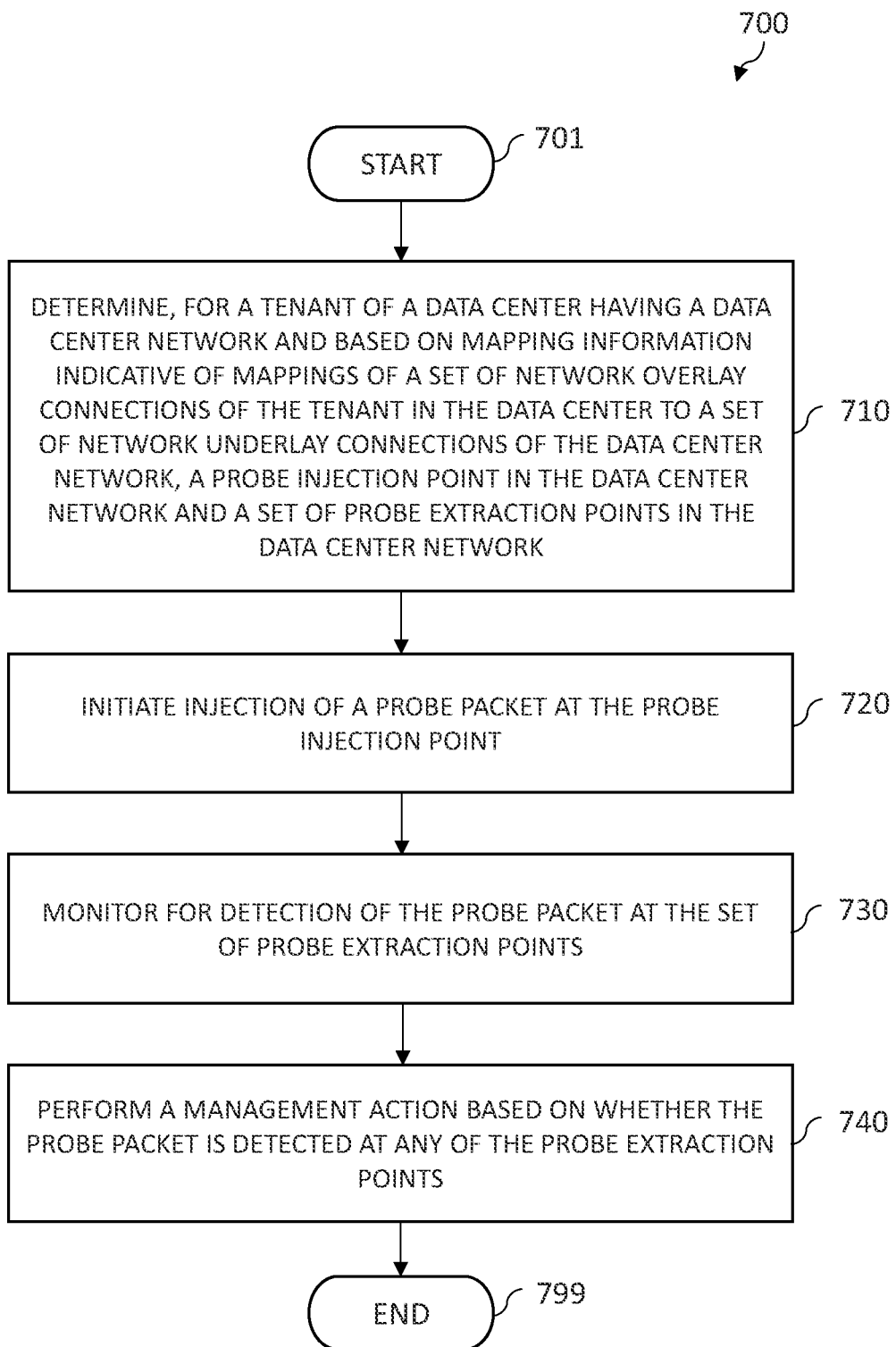
FIG. 7 depicts an example embodiment of a method for use by a controller for supporting debugging of a fabric network of a data center fabric based on use of probes in the fabric network of the data center fabric.

FIG. 7 depicts an example embodiment of a method for use by a controller for supporting identification and diagnosis of problems or potential problems in a data center (e.g., data center fabric) based on use of probes in a data center network (e.g., fabric network) of the data center (e.g., data center fabric). It will be appreciated that, although primarily presented as being performed serially, at least a portion of the functions of method 700 may be performed contemporaneously or in a different order than as presented with respect to FIG. 7. At block 701, method 700 begins. At block 710, determine, for a tenant of a data center having a data center network and based on mapping information indicative of mappings of a set of network overlay connections of the tenant in the data center to a set of network underlay connections of the data center network, a probe injection point in the data center network and a set of probe extraction points in the data center network. At block 720, initiate injection of a probe packet at the probe injection point. At block 730, monitor for detection of the probe packet at the set of probe extraction points. At block 740, perform a management action based on whether the probe packet is detected at any of the probe extraction points. At block 799, method 700 ends.

Figure 8:
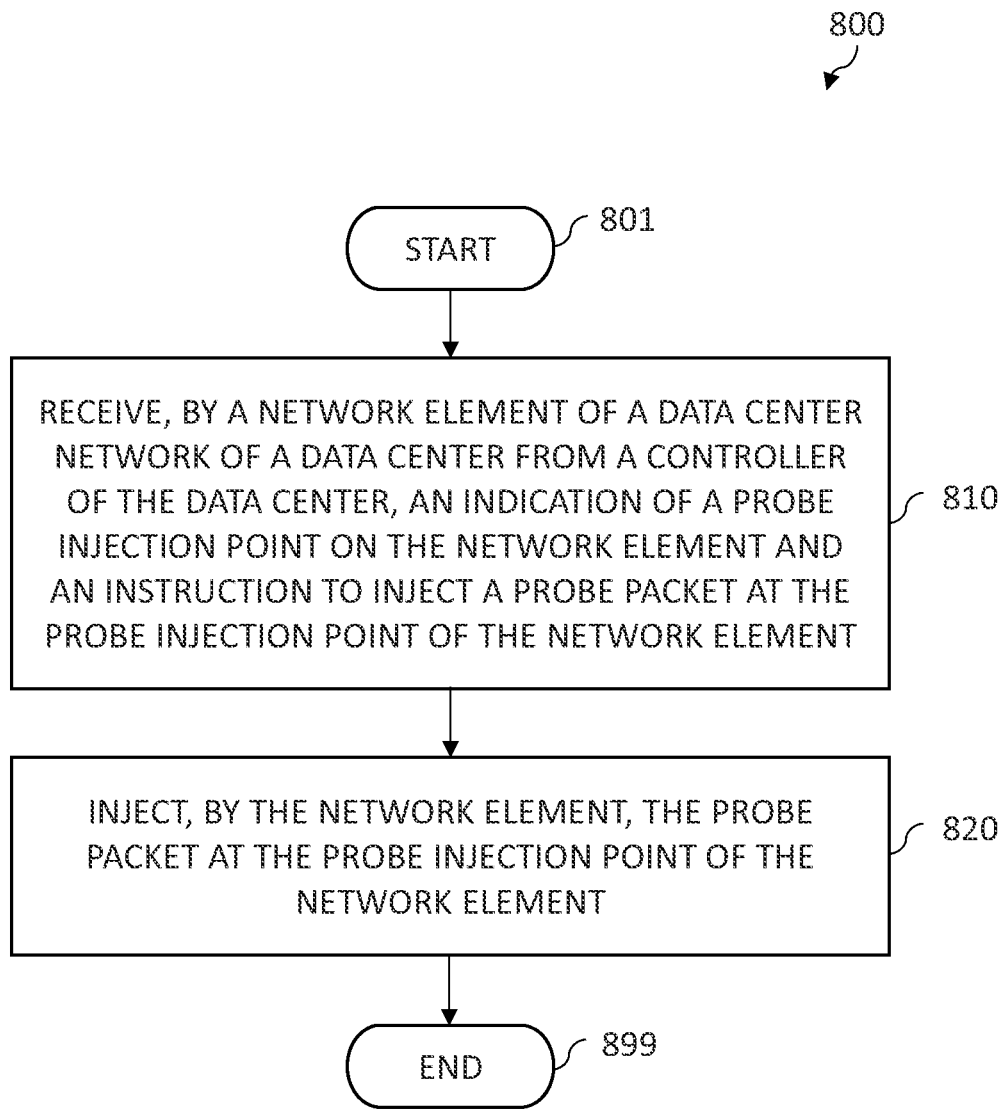
FIG. 8 depicts an example embodiment of a method for use by a network element for supporting debugging of a fabric network of a data center fabric based on use of probes in the fabric network of the data center fabric.

FIG. 8 depicts an example embodiment of a method for use by a network element for supporting identification and diagnosis of problems or potential problems in a data center (e.g., data center fabric) based on use of probes in a data center network (e.g., fabric network) of the data center (e.g., data center fabric). It will be appreciated that, although primarily presented as being performed serially, at least a portion of the functions of method 800 may be performed contemporaneously or in a different order than as presented with respect to FIG. 8. At block 801, method 800 begins. At block 810, receive, by a network element of a data center network of a data center from a controller of the data center, an indication of a probe injection point on the network element and an instruction to inject a probe packet at the probe injection point of the network element. At block 820, inject, by the network element of the data center network, a probe packet at the probe injection point of the network element. At block 899, method 800 ends.

Figure 9:
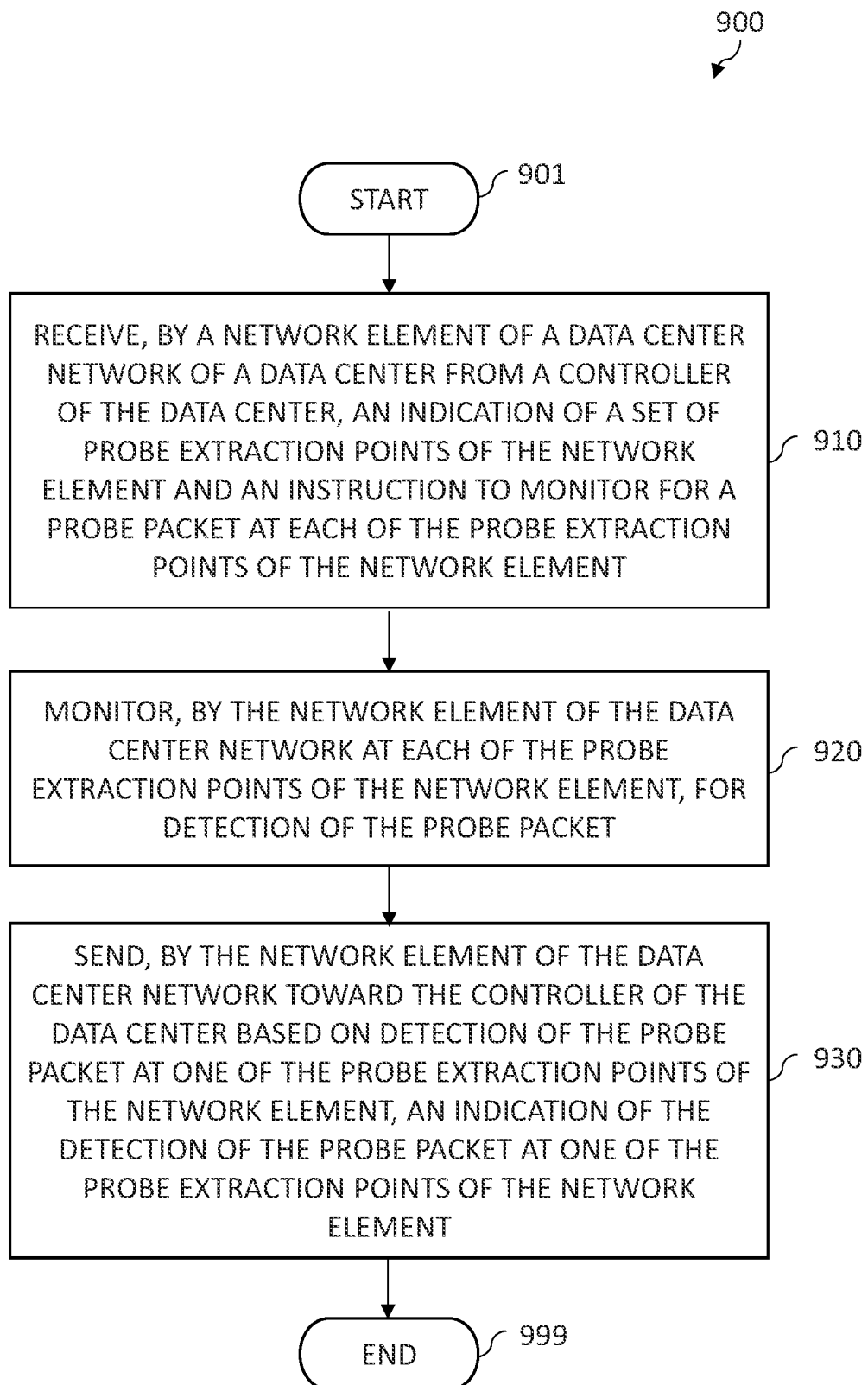
FIG. 9 depicts an example embodiment of a method for use by a network element for supporting debugging of a fabric network of a data center fabric based on use of probes in the fabric network of the data center fabric.

FIG. 9 depicts an example embodiment of a method for use by a network element for supporting identification and diagnosis of problems or potential problems in a data center (e.g., a data center fabric) based on use of probes in a data center network (e.g., fabric network) of the data center (e.g., data center fabric). It will be appreciated that, although primarily presented as being performed serially, at least a portion of the functions of method 900 may be performed contemporaneously or in a different order than as presented with respect to FIG. 9. At block 901, method 900 begins. At block 910, receive, by a network element of a data center network of a data center from a controller of the data center, an indication of a set of probe extraction points of the network element and an instruction to monitor for a probe packet at each of the probe extraction points of the network element. At block 920, monitor, by the network element of the data center network at each of the probe extraction points of the network element, for detection of the probe packet. At block 930, send, by the network element of the data center network toward the controller of the data center based on detection of the probe packet at one of the probe extraction points of the network element, an indication of the detection of the probe packet at one of the probe extraction points of the network element. At block 999, method 900 ends.

It will be appreciated that, various other functions for debugging a fabric network of a data center fabric based on use of probes may be supported.

Various example embodiments for supporting data center management may provide various advantages or potential advantages. For example, various example embodiments for supporting data center management may be configured to support configuration of a data center fabric based on merging and unmerging of underlay and overlay configurations. For example, various example embodiments for supporting data center management may be configured to support improved identification and diagnosis of problems or potential problems in a data center fabric based on use of probes. Various example embodiments for supporting data center management may provide various other advantages or potential advantages.

Figure 10:
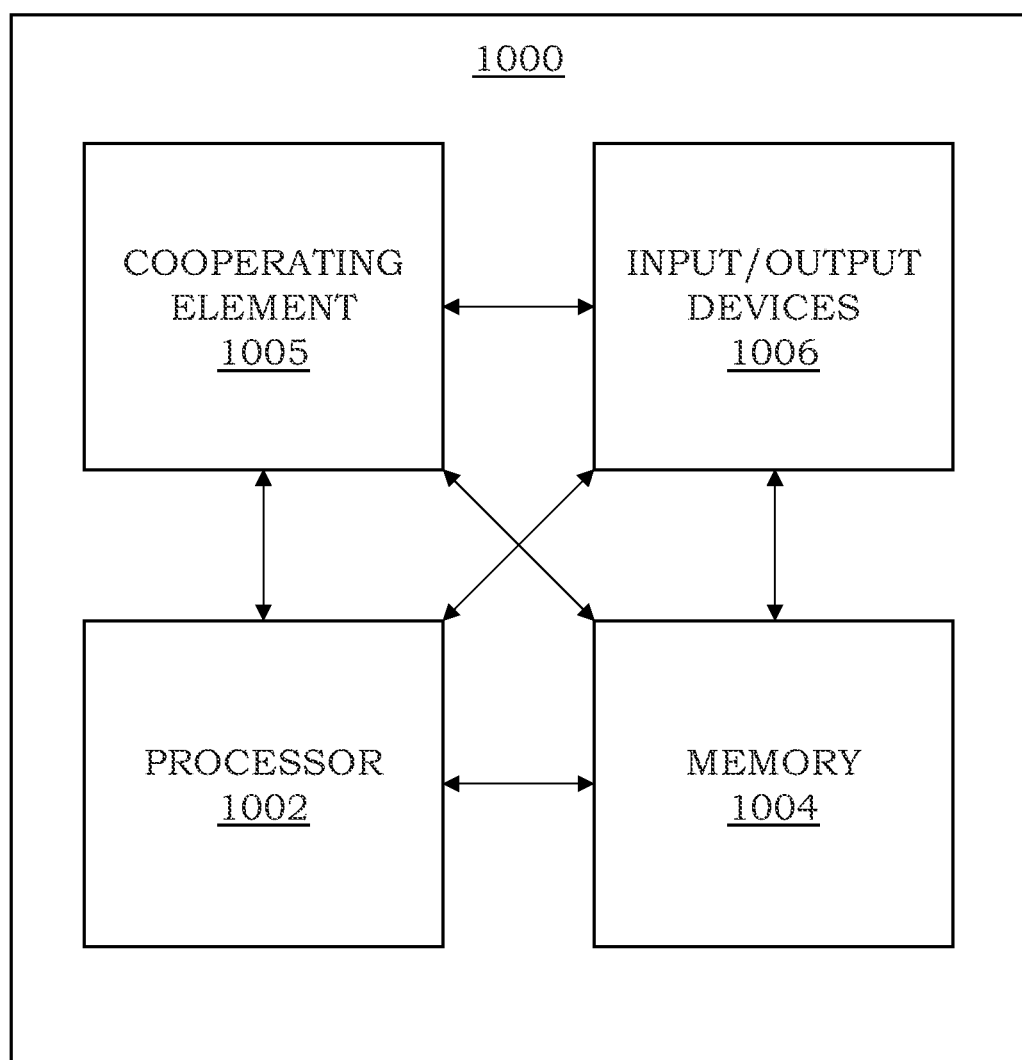
FIG. 10 depicts an example embodiment of a computer suitable for use in performing various functions presented herein.

FIG. 10 depicts an example embodiment of a computer suitable for use in performing various functions presented herein.

The computer 1000 includes a processor 1002 (e.g., a central processing unit (CPU), a processor, a processor having a set of processor cores, a processor core of a processor, or the like) and a memory 1004 (e.g., a random access memory, a read only memory, or the like). The processor 1002 and the memory 1004 may be communicatively connected. In at least some example embodiments, the computer 1000 may include at least one processor and at least one memory including computer program code, wherein the at least one memory and the computer program code are configured, with the at least one processor, to cause the computer to perform various functions presented herein.

The computer 1000 also may include a cooperating element 1005. The cooperating element 1005 may be a hardware device. The cooperating element 1005 may be a process that can be loaded into the memory 1004 and executed by the processor 1002 to implement various functions presented herein (in which case, for example, the cooperating element 1005 (including associated data structures) can be stored on a non-transitory computer-readable storage medium, such as a storage device or other suitable type of storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements described herein, or the like, as well as various combinations thereof. For example, computer 1000 may provide a general architecture and functionality that is suitable for implementing one or more devices presented herein, such as a controller or a portion thereof, a network element or a portion thereof (e.g., switches, routers, or the like), or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
  at least one processor; and
  at least one memory including instructions that, when executed by the at least one processor, cause the apparatus to at least:
    determine, for a data center that includes a set of servers and that includes a data center network supporting communications for the set of servers, mapping information for a tenant of the data center, wherein the mapping information is indicative of a mapping of a network overlay connection of the tenant in the data center network to a set of network underlay connections of the data center network, wherein the network overlay connection of the tenant is between a first leaf switch of the data center network and a second leaf switch of the data center network, wherein the set of network underlay connections of the data center network includes a first network underlay connection between the first leaf switch and a first switch of the data center network and a second network underlay connection between the first leaf switch and a second switch of the data center network;
    determine, based on the mapping information, a probe injection point in the data center network and a set of probe extraction points in the data center network, wherein the probe injection point is located on the first leaf switch and the set of probe extraction points is located on at least one of the first switch or the second switch; and
    support, based on the probe injection point and the set of probe extraction points, probing of the data center network.

2. The apparatus of claim 1, wherein the probe injection point is a tunnel endpoint of a tunnel and the set of probe extraction points includes a set of ports.

3. The apparatus of claim 2, wherein at least one of the first leaf switch or the second leaf switch is a top of rack switch.

4. The apparatus of claim 2, wherein at least one of the first switch or the second switch is a spine switch.

5. The apparatus of claim 1, wherein the probe injection point is a port on the first leaf switch and the set of probe extraction points includes a set of one or more tunnel endpoints of one or more tunnels.

6. The apparatus of claim 5, wherein the first leaf switch is a top of rack switch.

7. The apparatus of claim 5, wherein at least one of the first switch or the second switch is a spine switch.

8. The apparatus of claim 1, wherein the probe injection point is a port on the first leaf switch and the set of probe extraction points includes a first port on the first switch and a second port on the second switch.

9. The apparatus of claim 1, wherein, to support probing of the data center network, the instructions, when executed by the at least one processor, cause the apparatus to at least:
  initiate injection of a probe packet at the probe injection point; and
  monitor for detection of the probe packet at the set of probe extraction points.

10. The apparatus of claim 9, wherein, to initiate injection of the probe packet at the probe injection point, the instructions, when executed by the at least one processor, cause the apparatus to at least:
  send, toward the first leaf switch with which the probe injection point is associated, the probe packet or instructions for generating the probe packet.

11. The apparatus of claim 9, wherein, to monitor for detection of the probe packet at the set of probe extraction points, the instructions, when executed by the at least one processor, cause the apparatus to at least:
  monitor for receipt, from one or more of the at least one of the first switch or the second switch with which the probe extraction points are associated, of one or more messages indicative that the probe packet was received at one or more of the probe extraction points.

12. The apparatus of claim 9, wherein the instructions, when executed by the at least one processor, cause the apparatus to at least:
  perform a management action based on whether the probe packet is detected at any of the probe extraction points.

13. The apparatus of claim 12, wherein, to perform the management action, the instructions, when executed by the at least one processor, cause the apparatus to at least one of raise an alarm or initiate a message.

14. The apparatus of claim 12, wherein, to perform the management action, the instructions, when executed by the at least one processor, cause the apparatus to at least:
  determine, based on second mapping information and an indication of one of the extraction points at which the probe packet was detected, a second probe injection point and a set of second probe extraction points;
  initiate injection of a second probe packet at the second probe injection point;
  monitor for detection of the second probe packet at the set of second probe extraction points; and
  perform a second management action based on whether the second probe packet is detected at any of the second probe extraction points.

15. A method, comprising:
  determining, for a data center that includes a set of servers and that includes a data center network supporting communications for the set of servers, mapping information for a tenant of the data center, wherein the mapping information is indicative of a mapping of a network overlay connection of the tenant in the data center network to a set of network underlay connections of the data center network, wherein the network overlay connection of the tenant is between a first leaf switch of the data center network and a second leaf switch of the data center network, wherein the set of network underlay connections of the data center network includes a first network underlay connection between the first leaf switch and a first switch of the data center network and a second network underlay connection between the first leaf switch and a second switch of the data center network;

determining, based on the mapping information, a probe injection point in the data center network and a set of probe extraction points in the data center network, wherein the probe injection point is located on the first leaf switch and the set of probe extraction points is located on at least one of the first switch or the second switch; and supporting, based on the probe injection point and the set of probe extraction points, probing of the data center network.

16. An apparatus, comprising:

at least one processor; and at least one memory including instructions that, when executed by the at least one processor, cause the apparatus to at least:

receive, for a tenant of a data center including a data center network, an indication of a traffic source of the tenant and a traffic destination of the tenant;

obtain, for the tenant of the data center, mapping information indicative of a mapping of a network overlay connection of the tenant in the data center to a set of network underlay connections of the data center network;

determine, based on the mapping information, that the traffic source of the tenant is connected to a leaf switch of the data center network;

determine, based on the mapping information, that the leaf switch supports a route associated with the network overlay connection that points to a first spine switch associated with a first network underlay connection of the data center network and that points to a second spine switch associated with a second network underlay connection of the data center network;

determine a probe injection point on the leaf switch and a set of probe extraction points that includes a first probe extraction point on the first spine switch and a second probe extraction point on the second spine switch; and support, based on the probe injection point and the set of probe extraction points, probing for the tenant of the data center.

* * * * *